(12) United States Patent
Suzuki et al.

(10) Patent No.: US 6,952,295 B2
(45) Date of Patent: Oct. 4, 2005

(54) HOLOGRAM SCREEN AND HOLOGRAM DISPLAY

(75) Inventors: Kazunori Suzuki, Nagoya (JP); Kenichiro Takada, Kuwana (JP)

(73) Assignee: Denso Corporation, Kariya (JP)

( * ) Notice: Subject to any disclaimer, the term of this patent is extended or adjusted under 35 U.S.C. 154(b) by 328 days.

(21) Appl. No.: 10/035,329

(22) Filed: Jan. 4, 2002

(65) Prior Publication Data

US 2002/0159111 A1 Oct. 31, 2002

(30) Foreign Application Priority Data

Jan. 9, 2001 (JP) ........................................ 2001-001744
Nov. 21, 2001 (JP) ........................................ 2001-356220

(51) Int. Cl.⁷ .............................................. G02B 5/32
(52) U.S. Cl. .............................. 359/15; 359/19; 359/9; 359/1; 359/32; 359/449; 359/454; 359/630
(58) Field of Search ................................ 359/1, 15, 19, 359/9, 32, 458, 449, 454, 630, 24; 349/112

(56) References Cited

U.S. PATENT DOCUMENTS 6,424,395 B1 * 7/2002 Sato et al. .................. 349/112

FOREIGN PATENT DOCUMENTS

JP    A-11-202417    7/1999

* cited by examiner

*Primary Examiner*—Fayez G. Assaf
(74) *Attorney, Agent, or Firm*—David Posz

(57) ABSTRACT

A hologram screen 1 displays an image by diffracting and scattering image light 31 projected from an image projection apparatus 2. An upward/downward light scattering device 13, which scatters light incident from an upward/downward specific angle range spreading obliquely upward or downward, is placed on the image projection apparatus side of a hologram device 12 in the hologram screen 1. A leftward/rightward light scattering device 14, which scatters light incident from a leftward/rightward specific angle range spreading obliquely leftward and rightward, is placed between the hologram device 12 and the scattering device 13. The construction is such that the upward/downward specific angle range contains the incidence angle of the image light 31 on the hologram screen 1, and thus provides a hologram screen having good color reproducibility and which permits viewing of the background.

23 Claims, 24 Drawing Sheets

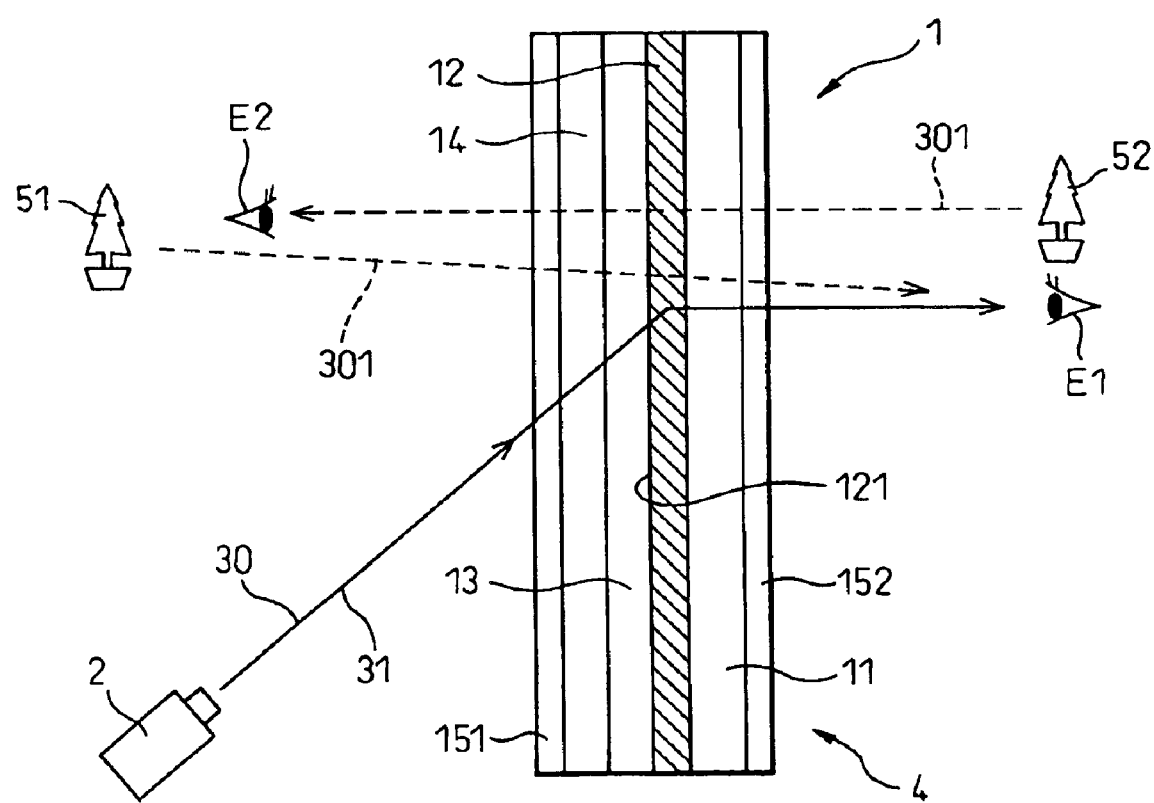

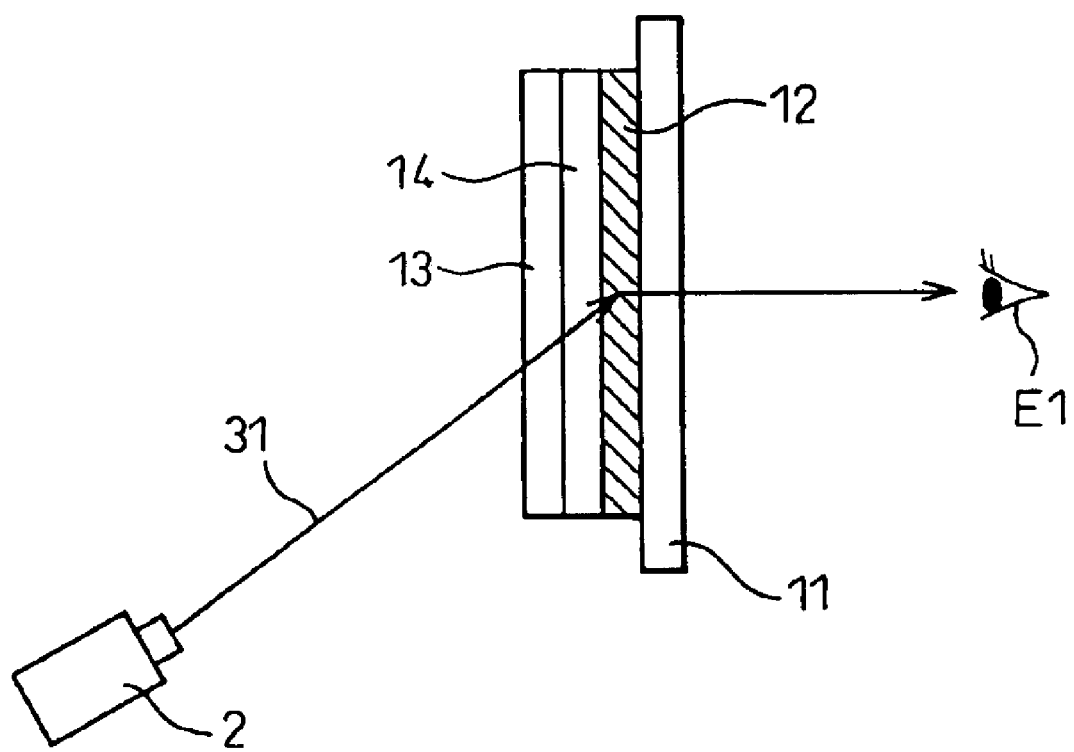

| a | b | c | d | e |
|---|---|---|---|---|
| f | g | h | i | j |
| k | . | . | . | . |
| . | . | . | . | . |
| . | . | . | . | . |

↙ 120

HOLOGRAM SCREEN AND HOLOGRAM DISPLAY

BACKGROUND OF THE INVENTION

1. Field of the Invention

The present invention relates to a hologram screen and a hologram display for displaying images by projecting image light thereon.

2. Description of the Related Art

As shown in FIG. 30, it is known in the art to provide a hologram screen 9 which is attached to a store display window or the like and displays moving or still images for advertising or other purposes.

The hologram screen 9 comprises, as shown in FIG. 30, a transparent member 91 and a hologram film 92 laminated to the transparent member 91.

The basic concept of the hologram screen 9 is as shown in FIG. 30; that is, image light 31 is projected onto the hologram film 92 from a projection apparatus 2 (for example, a projector) positioned below (or above) the rear side of the hologram screen 9, i.e., the side opposite from the side being viewed by an image observer E, and the image light 31 focused as images on the hologram film 92 is diffracted and scattered forwardly by the hologram film 92 thereby presenting the images for viewing by the image observer E.

The hologram film 92 used for the hologram screen 9 is produced by recording a scatterer on a photosensitive member in an optical exposure system.

However, the hologram screen 9 using the thus produced hologram film 92 has had the problem that the colors of the images projected by the projection apparatus 2 cannot be reproduced correctly, for example, the projected images appear somewhat greenish.

To investigate this problem, when the spectral characteristics of the hologram film 92 were measured and analyzed, as disclosed in Japanese Unexamined Patent Publication No. 11-202419, it was found that the image color reproducibility degraded presumably because the hologram film 92 has such a spectral distribution that its efficiency greatly varies depending on the wavelength of the diffracted light.

This led to the discovery that the color reproducibility of the images displayed on the hologram screen 9 improves when a certain degree of spreading is provided to the image light 31 incident on each portion of the hologram film 92.

In view of this, there has been proposed a hologram screen that uses the hologram film 92 in combination with a light scattering device constructed as a means for providing a certain degree of spreading to the image light 31 projected from the projection apparatus 2 and incident on the hologram film 92 (Japanese Unexamined Patent Publication No. 11-202417).

However, if the light scattering device is simply combined with the hologram film 92, satisfactory color reproducibility cannot be achieved.

On the other hand, it is also important that the hologram screen inherently be designed so that the image observer E can see the background behind the hologram screen 9 as well (see FIG. 3 and FIG. 6).

The prior art hologram screen 9 has the further problems that the color changes or the viewing area becomes narrower as the observer moves away from a direct ling of sight, and that, when the screen is constructed by joining multiple holograms, color differences occur at the joins.

Furthermore, the prior art hologram screen 9 has had the problem that, as the projection distance of the image projection apparatus increases with increasing screen size, the hologram device has to be remade to match the increased projection distance and the size cannot be increased by simply combining the same components together as with television sets. A production method for increasing the hologram screen size is disclosed in Japanese Unexamined Patent Publication No. 11-102153, but with this method also, the hologram device has had to be remade as the projection distance of the image projection apparatus increases.

SUMMARY OF THE INVENTION

In view of the above problems of the prior art, it is an object of the present invention to provide a hologram screen that has good color reproducibility and permits viewing of the background, and a hologram display using such a hologram screen.

According to a first aspect of the present invention, there is provided a hologram screen for displaying an image by diffracting and scattering image light projected from an image projection apparatus, comprising:

a first light scattering device, placed on an image projection apparatus side of a hologram device in the hologram screen, for scattering light incident from a specific angle range; and a second light scattering device, placed between the hologram device and the first light scattering device or on the image projection apparatus side of the first light scattering device, for scattering light incident from a specific angle range which is substantially different from the specific angle range of the first light scattering device, wherein the specific angle range of the first or second light scattering device is set so that an incidence angle range within which the image light is incident on the hologram screen contains an incidence angle at which the image light is incident on the hologram screen.

The image projection device is an apparatus, such as a liquid crystal projector, that has the function of projecting images by focusing on the screen, the images including, for example, still or moving images in full color or monochrome.

According to a second aspect of the invention, it is preferable that the specific angle range of the first light scattering device and the specific angle range of the second light scattering device each have an angle difference of 10° or greater from a vertical to the hologram screen.

By providing an angle difference of 10° or greater, a good hologram screen free from color changes can be obtained.

According to a third aspect of the invention, there is provided a hologram screen for displaying an image by diffracting and scattering image light projected from an image projection apparatus, comprising:

an upward/downward light scattering device placed on an image projection apparatus side of a hologram device in the hologram screen, and oriented so as to scatter light incident from at least one upward/downward specific angle range spreading obliquely upward or obliquely downward; and a leftward/rightward light scattering device placed between the hologram device and the upward/downward light scattering device or on the image projection apparatus side of the upward/downward light scattering device, and oriented so as to scatter light incident from a leftward/rightward specific angle range spreading obliquely leftward and obliquely rightward, wherein the upward/downward specific angle range contains an incidence angle at which the image light is incident on the hologram screen.

The upward/downward specific angle range refers to a specific angle range spreading in upward/downward directions relative to the upward/downward light scattering device when the hologram screen is set up in the upright position (see reference numeral 61 in FIG. 2A).

The material for the transparent member is, for example, polycarbonate, acrylate, vinyl chloride, another resin, or glass.

The spreading angle of the light scattered by the upward/downward light scattering device is preferably 5° or greater.

The leftward/rightward specific angle range refers to a specific angle range spreading in leftward/rightward directions relative to the leftward/rightward light scattering device when the hologram screen is set up in the upright position (see reference numeral 62 in FIG. 2B). The leftward/rightward directions are substantially perpendicular to the upward/downward directions in which the light is scattered by the upward/downward light scattering device.

The advantageous effect of the third aspect of the invention will be described below.

The upward/downward light scattering device is placed on the image projection apparatus side of the hologram device. When the image light from the upward/downward specific angle range is projected toward the hologram device, the image light is scattered by the upward/downward light scattering device in upward/downward directions before it strikes the hologram device. Furthermore, because of the provision of the leftward/rightward light scattering device, the image light is scattered by the leftward/rightward light scattering device in leftward/rightward directions before it strikes the hologram device.

Whether the leftward/rightward light scattering device is placed on the image projection apparatus side of the upward/downward light scattering device or on the opposite side of it has little effect on the degree of scattering of the image light that finally enters the hologram device.

The effects of the upward/downward light scattering device and the leftward/rightward light scattering device will be described with reference to FIG. 28A to FIG. 28D.

FIG. 28A is a diagram showing, in three dimensions, the effect exerted on the image light 31 when it passes through the leftward/rightward light scattering device 14 and the upward/downward light scattering device 13. FIG. 28C is a side view, and FIG. 28D is a top view. FIG. 28B shows the upward/downward light scattering device 13 and the leftward/rightward light scattering device 14 laminated together.

The image light 31 is first scattered by the leftward/rightward light scattering device 14 in leftward/rightward directions as shown in FIG. 28A and FIG. 28D, and then the image light 31, spread out as shown by a dashed line 331, is scattered by the upward/downward light scattering device 13 in upward/downward directions as shown in FIG. 28A and FIG. 28C, and emerges as scattered light spread out as shown by a rectangle 332.

When the upward/downward light scattering device 13 and the leftward/rightward light scattering device 14 are laminated together, as shown in FIG. 28B, the same phenomenon occurs. If the positions of the upward/downward light scattering device 13 and the leftward/rightward light scattering device 14 are interchanged, the image light 31 emerges as scattered light spread out in like manner.

The image light thus spread out to a certain extent in vertical and horizontal directions enters the hologram device. This enhances the image color reproducibility of the hologram screen. The reason is as follows.

Generally, a hologram device is a wavelength selective device and, therefore, has the characteristic that a specific color is intensified when reproduced. As a result, in the hologram device, if the incidence angle of the playback light (image light) changes, the wavelength of the light diffracted by the hologram and emerging from it also changes. This phenomenon is particularly pronounced in the case of a transmission-type hologram. In the case of a reflection-type hologram also, the phenomenon is particularly noticeable on a diffuse reflection type screen such as a hologram screen.

In the third aspect of the invention, because of the provision of the upward/downward light scattering device and the leftward/rightward light scattering device, the incidence angle is spread out in continuous fashion in vertical and horizontal directions, as a result of which diffracted rays of light with their peaks continuously varying toward longer or shorter wavelengths overlap each other; this serves to eliminate tinging with specific colors, and enhances the color reproducibility. Furthermore, whether the screen is viewed straight on or at an angle by shifting the line of sight upward or downward or leftward or rightward, hardly any difference can be observed in the displayed color.

This also serves to reduce color and brightness unevenness on the hologram screen.

On the other hand, since incident light outside the upward/downward specific angle range and the leftward/rightward specific angle range is not scattered but is passed through, a person on the front side of the hologram screen or a person on the rear side of the hologram screen can see the background through the hologram screen. That is, the field of vision of the image observer, etc. is not substantially obstructed by the hologram screen.

As described above, according to the third aspect of the invention, a hologram screen can be provided that has good color reproducibility and permits viewing of the background.

According to a fourth aspect of the present invention, there is provided a hologram screen for displaying an image by diffracting and scattering image light projected from an image projection apparatus, comprising:

an upward/downward light scattering device placed on an image projection apparatus side of a hologram device in the hologram screen, and oriented so as to scatter light incident from at least one upward/downward specific angle range spreading obliquely upward or obliquely downward; and a leftward/rightward light scattering device placed on an image observer side of the hologram device, and oriented so as to scatter light incident from a leftward/rightward specific angle range spreading obliquely leftward and obliquely rightward, wherein the upward/downward specific angle range contains an incidence angle at which the image light is incident on the hologram device.

This hologram screen differs from the hologram screen of the third aspect of the invention in that the leftward/rightward light scattering device is placed on the image observer side of the hologram device (see FIG. 20).

In this invention, since the image light diffracted and scattered by the hologram device is further scattered horizontally by the leftward/rightward light scattering device, changes in color and brightness that occur as the line of sight is moved leftward or rightward can be substantially reduced. Of course, excellent color reproducibility can also be achieved because the upward/downward light scattering device is provided on the image projection side.

According to a fifth aspect of the invention, when the leftward/rightward specific angle range is from γ leftward to δ rightward relative to the normal to the hologram screen, γ and δ preferably satisfy $$0° \leq \gamma \leq 25°, 0° \leq \delta \leq 25° \text{ (See FIG. 2B and FIG. 7)}$$

With this arrangement, when the hologram screen is viewed substantially straight on, since the background light is not superimposed on the image light, the contrast improves and the hologram screen can present images easy to view. Further, when the hologram screen is viewed from an angle (greater than γ leftward or greater than δ rightward), the viewer can see the background on the image projection apparatus side of the hologram screen.

The leftward/rightward specific angle range is substantially the same at any point on the leftward/rightward light scattering device. Considering the lens performance of an image projection apparatus commonly used today, the incidence angle of light projected from the image projection apparatus to the left and right edges of the hologram screen is about 20° and 25°; therefore, if the angle is within the above angle range, the color reproducibility enhancing effect can be obtained over the entire screen.

According to a sixth aspect of the invention, when the leftward/rightward specific angle range is from $\gamma_1$ to $\gamma_2$ leftward and from $\delta_1$ to $\delta_2$ rightward relative to the normal to the hologram screen, $\gamma_1$, $\gamma_2$, $\delta_1$, and $\delta_2$ preferably satisfy $$20° \leq \gamma_1 \leq 25°, 65° \leq \gamma_2 \leq 70°$$

$$20° \leq \delta_1 \leq 25°, 65° \leq \delta_2 \leq 70° \text{ (FIG. 19)}$$

In this case, when the hologram screen is viewed substantially straight on, the viewer can see the background on the opposite side of the hologram screen. It is thus possible to give a sensation of wonder to the image viewer without impairing the transparency of the hologram screen.

When the hologram screen is viewed from an angle within the range of $\gamma_1$ to $\gamma_2$ leftward or $\delta_1$ to $\delta_2$ rightward, as the background light is not superimposed on the image light, the contrast improves and the hologram screen can present images easy to view.

Especially, in oblique directions, the image brightness of the hologram screen decreases, but the background brightness does not decrease; therefore, if the leftward/rightward light scattering device were not provided, the contrast would degrade more than the image brightness would degrade.

When the leftward/rightward light scattering device is provided, as described above, as the background brightness decreases and objects in the background become invisible because of the scattering of the background light in oblique directions, image visibility can be greatly enhanced.

When the image on the hologram screen is viewed from an angle greater than 65° from the normal to the hologram screen, the image itself is difficult to view because the viewing angle is too large and, if the image brightness and contrast were improved, it would not necessarily lead to improvement in image visibility. As a result, if the upper limit angles $\gamma_2$ and $\delta_2$ are not set larger than 65°, it does not present any particular problem.

According to a seventh aspect of the invention, preferably the upward/downward light scattering device and the leftward/rightward light scattering device scatter at least 20% of the light incident within the upward/downward specific angle range and the leftward/rightward specific angle range, respectively.

With this configuration, the third or fourth effect of the invention, such as color reproducibility, can be achieved reliably. If the light scattered is less than 20%, the effects of the invention, such as color reproducibility enhancement and viewing angle enlargement, may not be obtained reliably.

According to an eighth aspect of the invention, it is desirable that the upward/downward light scattering device and the leftward/rightward light scattering device be both placed within 5 mm of the hologram device in the hologram screen.

If the upward/downward light scattering device, or the leftward/rightward light scattering device disposed on the image projection apparatus side of the hologram device, is spaced more than 5 mm away from the hologram device, a clear image display may not be obtained because of blurring of the image light on the hologram device.

On the other hand, if the leftward/rightward light scattering device disposed on the image observer side of the hologram device is spaced more than 5 mm away from the hologram device, the image diffracted by the hologram device is blurred by the leftward/rightward light scattering device, and in this case also, a clear image display may not be obtained.

When the upward/downward light scattering device and the leftward/rightward light scattering device are both placed within 5 mm of the hologram device, if blurring such as described above occurs, the amount of blurring can be accommodated within the image display section of the image projection apparatus, for example, within non-display portions between pixels in a liquid crystal device, the presence of pixel images projected on the screen becomes unnoticeable, and this in turn serves to improve the image quality.

According to a ninth aspect of the invention, preferably the upward/downward light scattering device and the leftward/rightward light scattering device are detachable.

The term detachable here means that "if the device once attached is removed, there is no glue or adhesive remaining on the device, and the device can be attached once again." Making the devices detachable offers the following advantages: the hologram screen can be used properly according to the environment in which it is used, for example, in the daytime when the image brightness becomes important, the upward/downward light scattering device and the leftward/rightward light scattering device are removed, and in the nighttime when reduced image brightness does not present a problem, the upward/downward light scattering device and the leftward/rightward light scattering device are attached; and the upward/downward light scattering device and the leftward/rightward light scattering device, if damaged, can be easily replaced.

According to a tenth aspect of the invention, the hologram screen may be constructed by joining together a plurality of hologram devices arranged in two dimensions.

In this case, a hologram screen substantially free from color differences occurring across the joins of the hologram devices, that is, a hologram screen having good color reproducibility and stable quality, can be obtained.

Further, in this case, as the screen size is increased, if the image light is to be projected using a single image projection apparatus, the projection distance of the image projection apparatus increases. Normally, this would require remaking the hologram devices to match the increased projection distance.

However, in the hologram screen of the present invention, because of the provision of the upward/downward light scattering device and the leftward/rightward light scattering device, the incidence angle is spread out in continuous fashion in vertical and horizontal directions; as a result, the image light can be projected at the same projection angle as the angle that was set at the time of manufacture. Therefore, all the hologram devices can be manufactured to have substantially the same color reproducibility, and this also facilitates the construction of a large size screen.

According to an eleventh aspect of the invention, all the plurality of hologram devices may be manufactured to have optically the same characteristics.

The phrase "optically the same characteristics" means that the hologram devices are manufactured using the same recording optical system, so that the projection angle of the image light and the spreading angle and color reproducibility of the diffracted and scattered emerging image light are the same for all the hologram devices.

When such holograms are joined together, one adjacent to another, and a single image projection apparatus is used to project image light, the image light projection angle for each hologram device would normally differ from that set at the time of manufacture.

By contrast, in the present invention, because of the provision of the upward/downward light scattering device and the leftward/rightward light scattering device, the incidence angle is spread out in continuous fashion in vertical and horizontal directions. As a result, the image light can be projected at the same projection angle as the angle that was set at the time of manufacture. Therefore, all the hologram devices can be manufactured to have substantially the same color reproducibility. Furthermore, the screen size can be increased.

According to a twelfth aspect of the invention, the plurality of hologram devices may be recorded using respectively different reference beams so that they have optically different characteristics.

In this case also, because of the same effect as the eleventh aspect of the invention, all the hologram devices can be manufactured to have substantially the same color reproducibility. Furthermore, the screen size can be increased.

According to a 13th aspect of the invention, the hologram screen may be constructed from a transmission-type hologram screen. In this case also, a hologram screen that has excellent color reproducibility and permits viewing of the background can be obtained.

According to a 14th aspect of the invention, the hologram screen may be constructed from a reflection-type hologram screen. In this case also, a hologram screen that has excellent color reproducibility and permits viewing of the background can be obtained.

According to a 15th aspect of the invention, the hologram device may be produced by recording a diffusing plate. In this case also, a hologram screen that has excellent color reproducibility and permits viewing of the background can be obtained.

According to a 16th aspect of the invention, the hologram screen may be constructed from a computer hologram.

To produce a computer hologram, a hologram device 120 is segmented into microscopic units of several tens of micrometers, for example, as shown in FIG. 29A, and diffraction wavelength, direction of diffraction, focusing position, etc. are set for each of the unit holograms a, b, c, . . . Next, the necessary diffraction grating 126 is calculated using a computer and processed, as shown in FIG. 29B. Therefore, to produce a hologram screen that exhibits excellent color reproducibility within a desired viewing angle range, an enormous amount of computation time and the processing time for forming the diffraction grating 126 would become necessary.

By contrast, in the present invention, since the upward/downward light scattering device and the leftward/rightward light scattering device are provided, the plurality of identical unit holograms can be processed as a single unit, making it possible to reduce the computation time and processing time.

According to a 17th aspect of the present invention, there is also provided a hologram display which comprises the hologram screen described above and an image projection apparatus for projecting image light onto the hologram screen.

According to this hologram display, the color reproducibility can be enhanced because of the thus far described advantageous effects, while also permitting viewing of the background on the opposite side of the hologram screen.

The invention can thus achieve a hologram display that has excellent color reproducibility and permits viewing of the background.

BRIEF DESCRIPTION OF THE DRAWINGS

These and other objects and features of the invention will become more fully apparent from the description of the preferred embodiments as set forth below with reference to the accompanying drawings, wherein:

FIG. 6 is a diagram for explaining the advantageous effect of the hologram screen according to the first embodiment;

FIG. 14 is a diagram for explaining the hologram screen of the third embodiment;

DESCRIPTION OF THE PREFERRED EMBODIMENTS

Embodiment 1

Figure 7:
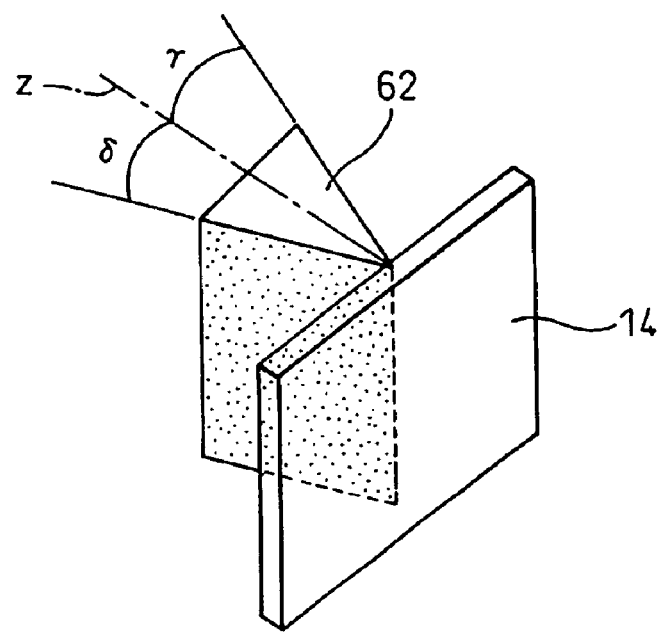
FIG. 7 is a perspective view of the leftward/rightward light scattering film according to the first embodiment.

A hologram screen and a hologram display according to one embodiment of the present invention will be described with reference to FIG. 1 to FIG. 8. Of FIG. 1 to FIG. 8, FIG. 2B, FIG. 4, and FIG. 5B are top views, FIG. 7 is a perspective view, and the others are side views.

Figure 1:
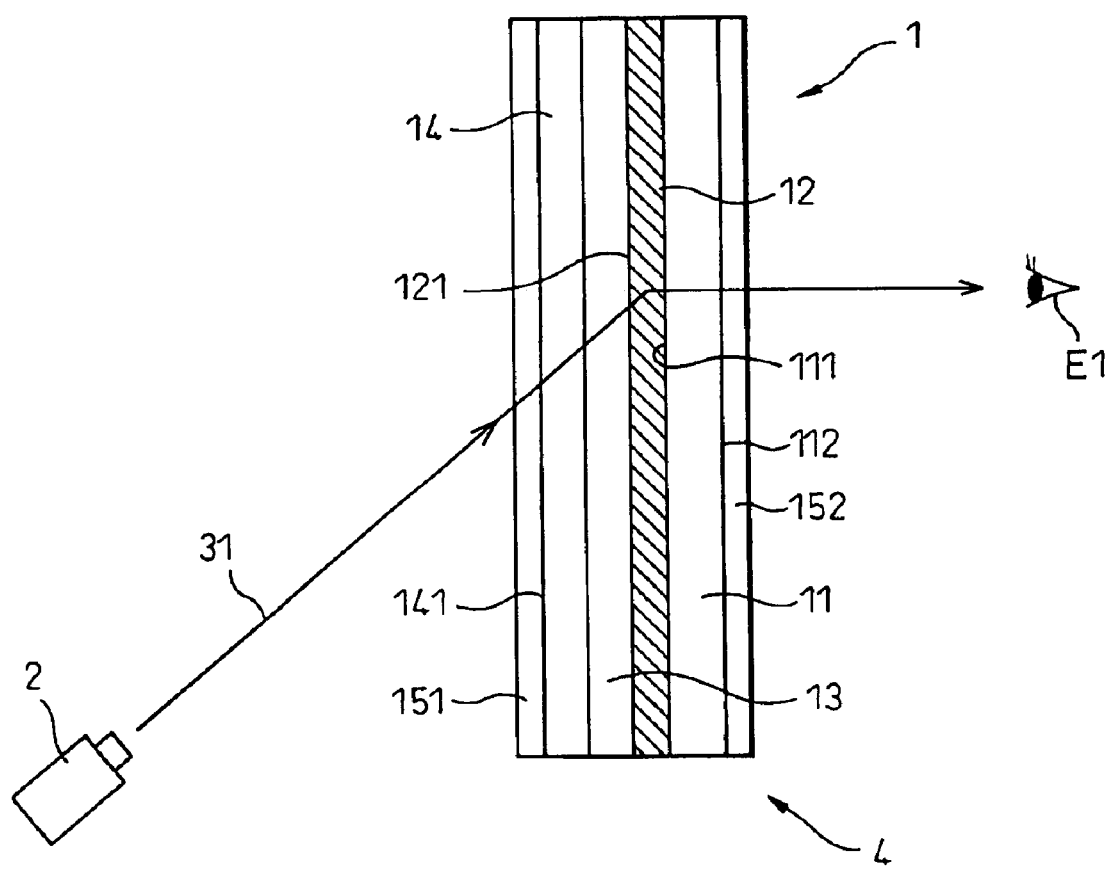
FIG. 1 is a diagram for explaining a hologram display according to a first embodiment.

As illustrated in FIG. 1, the hologram screen 1 of this embodiment comprises a transparent member 11 and a film-like hologram device (hereinafter called the "hologram film 12") laminated to the transparent member 11, and displays images by the image light 31 projected thereon from an image projection apparatus 2.

Figure 2A:
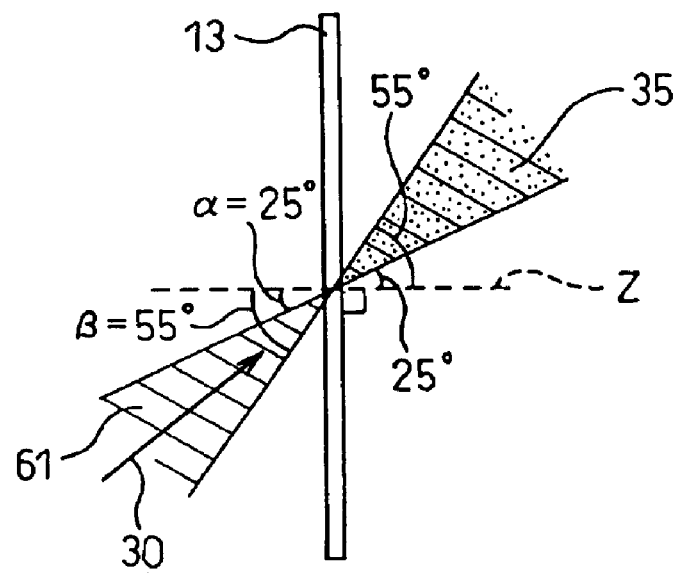
FIG. 2A is a side view for explaining the function of an upward/downward light scattering film according to the first embodiment.
Figure 2B:
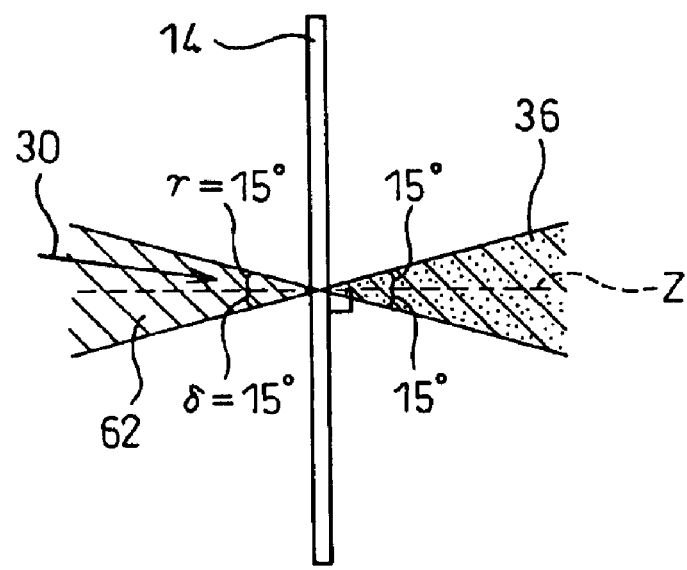
FIG. 2B is a top view for explaining the function of an leftward/rightward light scattering film according to the first embodiment.
Figure 3:
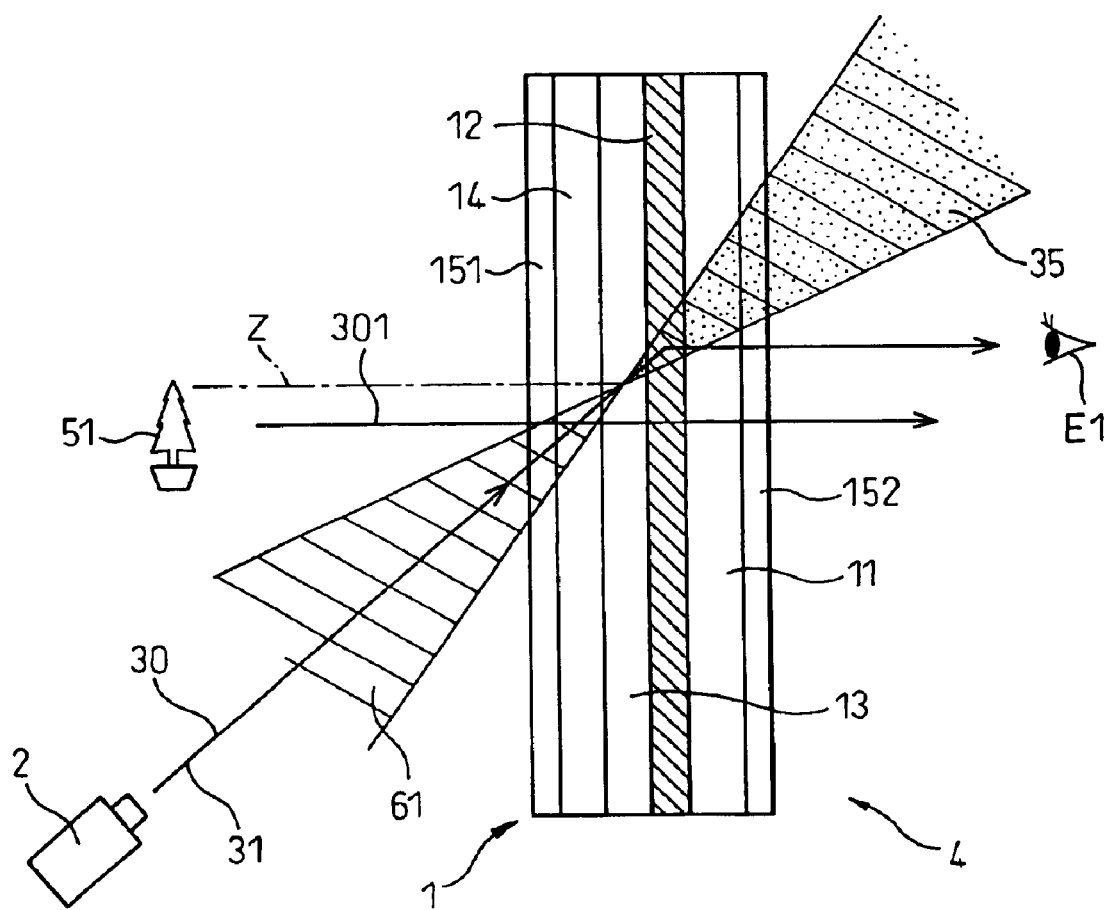
FIG. 3 is a side view for explaining the function of a hologram screen according to the first embodiment.

As shown in FIG. 2A and FIG. 3, a film-like light scattering device (hereinafter called the "upward/downward light scattering film 13") for scattering incident light 30 coming from an upward/downward specific angle range 61 is placed on the image projection apparatus side 121 of the hologram film 12.

The image projection apparatus 2 projects the image light 31 toward the hologram film 12 from an angle within the upward/downward specific angle range 61.

Here, the image projection apparatus 2 is a liquid crystal projector, and projects images such as still or moving images in full color or monochrome.

The transparent member 11 is made of acrylic material.

The upward/downward specific angle range 61 is from $\alpha=25°$ to $\beta=55°$ downward relative to the normal Z to the hologram film 12, that is, the normal to the upward/downward light scattering film 13.

The upward/downward light scattering film 13 is constructed using a view control film (for example, LUMISTY MFY-2555 (brand name) manufactured by Sumitomo Chemical), and is oriented so as to scatter the incident light 30 from specific upward/downward directions into specific upward/downward directions. More specifically, the upward/downward light scattering film 13 scatters the incident light 30 coming from the angle range of 25° to 55° downward and causes it to emerge as scattered light 35 at angles of 25° to 55° upward.

Figure 4:
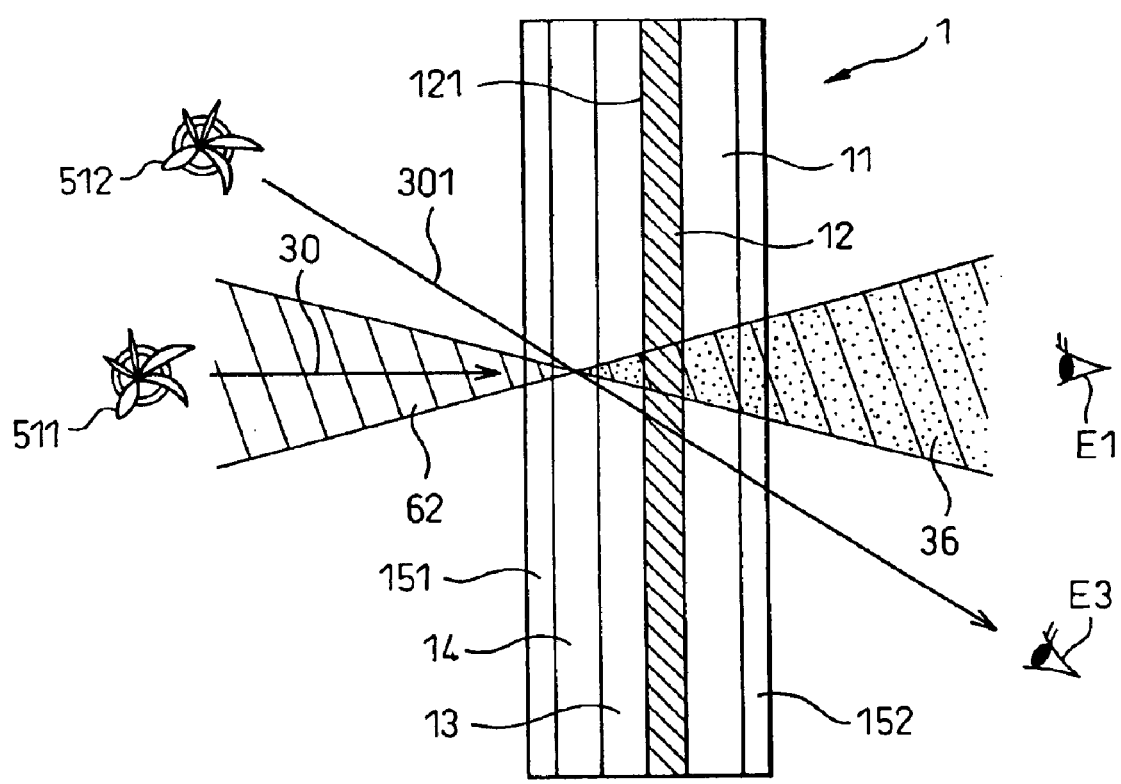
FIG. 4 is a top view for explaining the function of the hologram screen according to the first embodiment.

Further, as shown in FIG. 1 and FIG. 4, a film-like light scattering device (hereinafter called the "leftward/rightward light scattering film 14") (FIG. 2B and FIG. 7) for scattering incident light 30 coming from a leftward/rightward specific angle range 62 is placed on the image projection apparatus side 121 of the hologram film 12.

The leftward/rightward specific angle range 62 is from $\gamma=15°$ leftward to $\delta=15°$ rightward relative to the normal Z to the hologram film 12, that is, the normal to the leftward/rightward light scattering film 14.

The leftward/rightward light scattering film 14 constructed using a view control film (for example, LUMISTY MFX-1515 (brand name) manufactured by Sumitomo Chemical), and is oriented so as to scatter the incident light 30 from specific leftward/rightward directions into specific leftward/rightward directions. More specifically, the leftward/rightward light scattering film 14 scatters the incident light 30 coming from the angle range of 15° leftward to 15° rightward and causes it to emerge as scattered light 36 at angles of 15° leftward to 15° rightward.

The hologram film 12 is attached by an adhesive to the image projection apparatus side 111 of the transparent member 11, and the upward/downward light scattering film 13 and the leftward/rightward light scattering film 14 are attached in this order by an adhesive on the image projection apparatus side 121 of the hologram film 12.

Antireflective AR films 151 and 152 are attached to the image projection apparatus side 141 of the leftward/rightward light scattering film 14 and the image observer side 112 of the transparent member 11, respectively.

The hologram screen 1 of this embodiment is a transmission-type hologram screen.

The hologram display 4 of this embodiment comprises, as shown in FIG. 1, the hologram screen 1 and the image projection apparatus 2 described above.

Figure 5A:
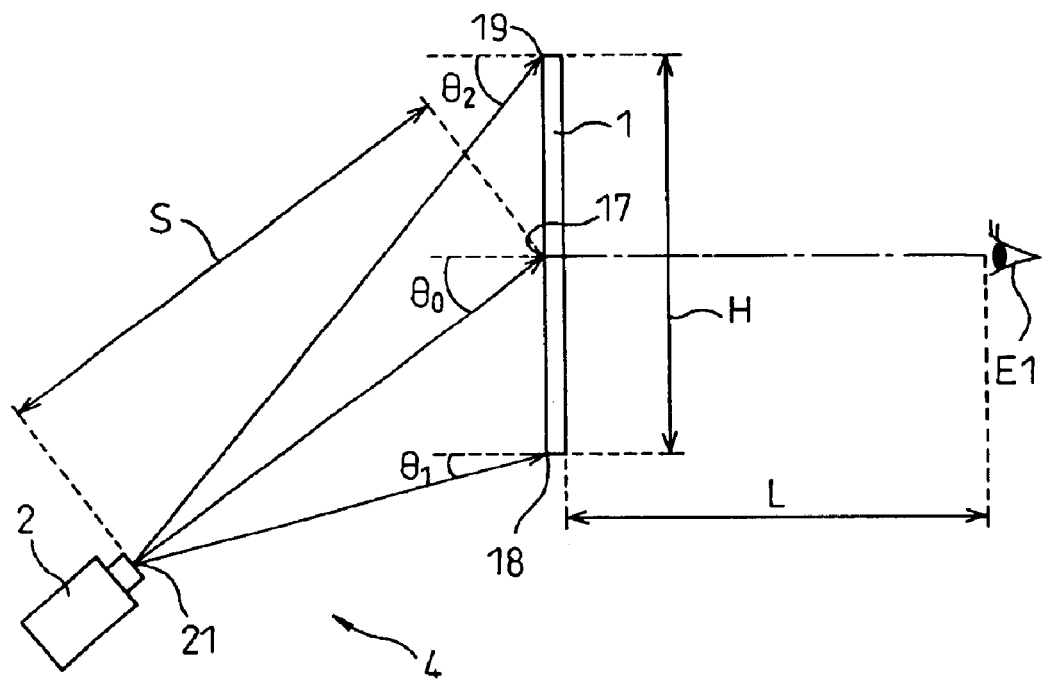
FIG. 5A is a side view for explaining the arrangement of an image projection apparatus relative to the hologram screen according to the first embodiment.

In the hologram display 4, as shown in FIG. 5A, the angle $\theta_1$ of projection from the lens center 21 of the image projection apparatus 2 to the lower edge 18 of the hologram screen 1 and the angle $\theta_2$ of projection from the lens center 21 of the image projection apparatus 2 to the upper edge 19 of the hologram screen 1 are both contained in the upward/downward specific angle range 61 (FIG. 2A).

That is, when the upward/downward specific angle range 61 is defined by limits α and β, the following relation holds.

$$\alpha \leq \theta_1 < \theta_2 \leq \beta \quad (1)$$

Further, when the vertical length of the hologram screen 1 is denoted by H, the distance from the lens center of the image projection apparatus to the center of the hologram screen by S, and the projection angle of the image light to the center 17 of the hologram screen 1 by $\theta_0$, then the following relations hold.

$$\theta_1 = \tan^{-1}[\{S \sin \theta_0 - (H/2)\}/S \cos \theta_0] \quad (2)$$

$$\theta_2 = \tan^{-1}[\{S \sin \theta_0 + (H/2)\}/S \cos \theta_0] \quad (3)$$

Accordingly, H, S, and $\theta_0$ are set so that $\theta_1$ and $\theta_2$ satisfy the relation (1). Alternatively, the limits a and β of the upward/downward specific angle range 61 are set according to the required placement of the image projection apparatus 2 relative to the hologram screen 1.

In the present embodiment, since $\theta_0=35°$, $\alpha=25°$, and $\beta=55°$, S and H are determined accordingly so as to satisfy the relations (2) and (3) so that $\theta_1$ and $\theta_2$ satisfy the relation (1).

More specifically, in the present embodiment, S=180 cm and H=61 cm, and hence, $\theta_1=26.3°$ and $\theta_2=42.2°$.

Figure 5B:
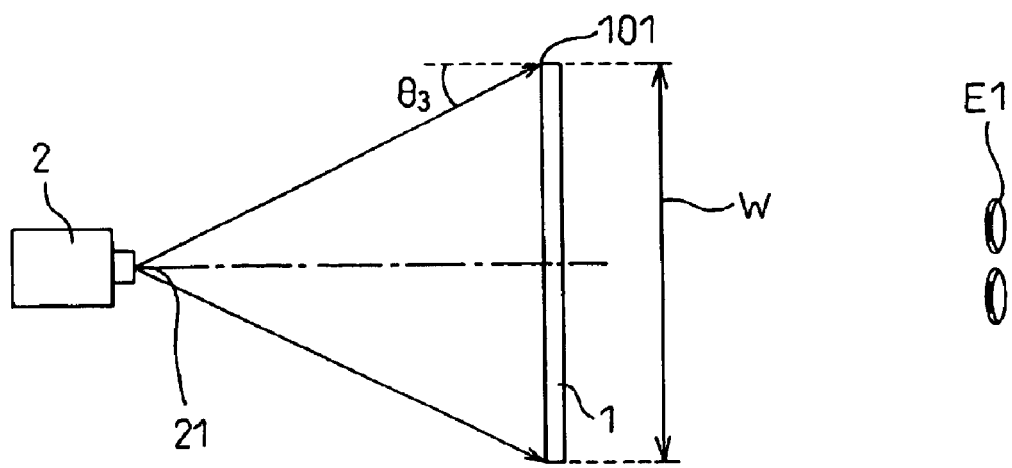
FIG. 5B is a top view for explaining the arrangement of the image projection apparatus relative to the hologram screen according to the first embodiment.

As for the leftward/rightward directions, in the hologram display 4, the angle $\theta_3$ of projection from the lens center 21 of the image projection apparatus 2 to the left edge 101 of the hologram screen 1 is substantially contained in the leftward/rightward specific angle range 62 (FIG. 4), as shown in FIG. 5B.

More specifically, when the horizontal length of the hologram screen 1 is denoted by W, the following relation holds.

$$\theta_3 = \tan^{-1}\{(W/2)/S \cos \theta_0\} \quad (4)$$

Then, W, S, and $\theta_0$ are set so that the relation $\theta_3 \leq \gamma$ holds, where γ is the rightward limit of the leftward/rightward specific angle range 62. Alternatively, the leftward/rightward specific angle range 62 of the leftward/rightward light scattering film 14 is set according to the required placement of the image projection apparatus 2 relative to the hologram screen 1.

In the present embodiment, W=812 mm and $\theta_3=15.4°$.

In the present embodiment, the relative placement between the image projection apparatus 2 and the hologram screen 1 has been determined according to the performance of the upward/downward light scattering film 13 and leftward/rightward light scattering film 14, as described above, but conversely, the performance of the upward/downward light scattering film 13 and leftward/rightward light scattering film 14 may be selected according to the required placement of the image projection apparatus 2, etc.

Figure 8:
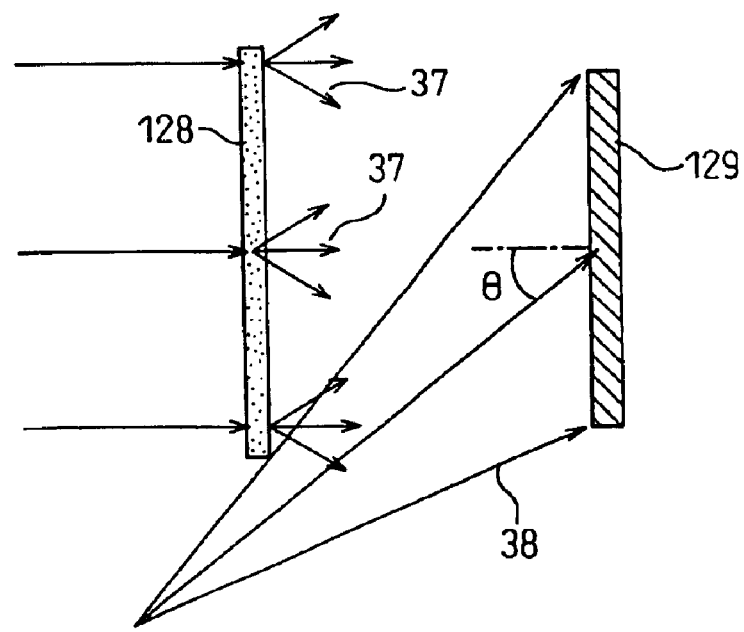
FIG. 8 is a diagram for explaining a method for producing a hologram film according to the first embodiment.

The hologram film 12 is produced by recording a diffusing plate, as shown in FIG. 8. More specifically, the diffusing plate 128 is placed relative to a photosensitive member 129, as shown in FIG. 8, and an object beam 37 is generated by diffracting and scattering the light passing through the diffusing plate 128. Then, a reference beam 38 incident at an angle from below is caused to interfere with the object beam 37 to form an interference pattern, thereby recording the diffusing plate 128.

The advantageous effects of the present embodiment will be described below.

As shown in FIG. 1, the upward/downward light scattering film 13 and the leftward/rightward light scattering film 14 are placed on the image projection apparatus side 121 of the hologram film 12. The image light 31 is projected toward the hologram film 12 from an angle within the upward/downward specific angle range 61. Here, the image light 31 is scattered by the upward/downward light scattering film 13 and the leftward/rightward light scattering film 14 just before it strikes the hologram film 12.

Consequently, the image light 31 enters the hologram film 12 with a certain degree of spreading provided to its incidence angle. Therefore, the image obtained with the image light 31 diffracted by the hologram film 12 has excellent color reproduction characteristics.

This also serves to enlarge the viewing angle range of the hologram screen 1, alleviate color unevenness, and achieve uniform brightness and screen gain distributions (see Embodiment 3).

Figure 30:
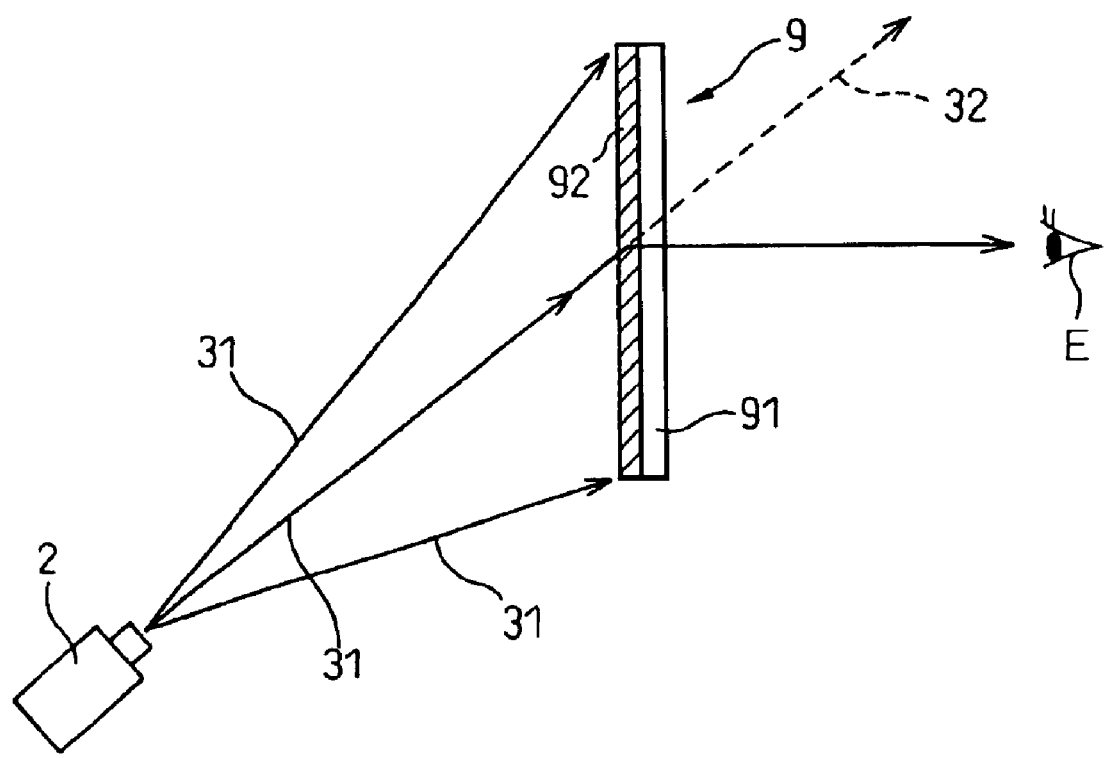
FIG. 30 is a diagram for explaining a hologram display according to the prior art.

Furthermore, since the image light 31 is scattered by the upward/downward light scattering film 13 and the leftward/rightward light scattering film 14 as described above, the zero-order beam (indicated by 32 in FIG. 30), i.e., the image light 31 passing undiffracted through the hologram screen 1, can be blocked. The zero-order beam is the beam from the image projection apparatus 2 (indicated by 32 in FIG. 30) that would otherwise enter the eyes of the image observer E1.

On the other hand, incident light 301 coming from outside the upward/downward specific angle range 61 and the leftward/rightward specific angle range 62 passes through the hologram screen 1 without being scattered by the upward/downward light scattering film 13 or the leftward/rightward light scattering film 14. As a result, as shown in FIG. 3 and FIG. 6, the image observer E1 viewing the hologram screen 1 or the rear-side observer E2 located on the same side as the image projection apparatus can see the background 51 or 52 on the opposite side of the hologram screen 1. That is, the field of vision of the image observer E1 as well as that of the rear-side observer E2 is not substantially obstructed by the hologram screen 1.

The upward/downward specific angle range 61 is from 25° to 55° downward relative to the normal Z to the hologram film 12, and the incidence angle of the image light 31 lies within the upward/downward specific angle range 61 with respect to the hologram screen 1. As a result, there is no concern that the zero-order beam enters the eyes of the observer viewing the hologram screen 1.

Further, the reference beam used when producing the hologram film 12 for the hologram screen 1 is projected at an incidence angle θ (see FIG. 8) which is approximately equal to the incidence angle of the image light 31. Therefore, when the image light 31 is projected from an angle within the upward/downward specific angle range 61, that is, within the range of 25° to 55° downward, the incidence angle θ of the reference beam is also set within the range of 25° to 55° downward.

As shown in FIG. 1, the leftward/rightward light scattering film 14 for scattering the incident light 30 incident from the leftward/rightward specific angle range 62 is placed on the image projection apparatus side 121 of the hologram film 12.

As a result, as shown in FIG. 4, the background 511 lying within the leftward/rightward specific angle range 62 on the opposite side of the hologram screen 1 is not visible to the image observer E1. When the hologram screen 1 is viewed within the leftward/rightward specific angle range 62, therefore, the image is easy to view as the background 511 is not superimposed on the image.

Furthermore, as the image light 31 can also be scattered in leftward/rightward directions before entering the hologram film 12, the color reproducibility of the hologram screen 1 can be further enhanced. This also serves to enlarge the viewing angle range of the hologram screen 1, achieve uniform brightness and screen gain distributions, prevent color differences, and so on.

Moreover, since the leftward/rightward specific angle range 62 is from 15° leftward to 15° rightward relative to the normal Z to the hologram film 12, when the hologram screen 1 is viewed substantially straight on from the front (from the position E1 in FIG. 4), the background 511 is not superimposed on the image and the image is therefore easy to view. When the hologram screen 1 is viewed from an oblique angle (greater than 15° leftward (from the position E3 in FIG. 4) or greater than 15° rightward), the viewer can see the background 512 on the image projection apparatus side of the hologram screen 1.

The antireflective AR films 151 and 152 are placed on both sides of the hologram screen 1.

Therefore, as shown in FIG. 6, the AR film 152 placed on the image observer side of the hologram screen 1 prevents the background 52 on the image observer side from reflecting into the hologram screen 1, and the AR film 151 placed on the image projection apparatus side prevents the background 51 on the image projection apparatus side from reflecting into the hologram screen 1. This makes the image easier to view for the image observer E1 because the background 52 is not reflected and superimposed on the displayed image. On the other hand, the rear-side observer E2 can easily view the background 52 on the image observer side through the hologram screen 1. However, in environments where reflections are not noticeable, the AR films 151 and 162 need not be provided.

As described above, according to the above embodiment, a hologram screen that has excellent color reproducibility and permits viewing of the background can be achieved.

Embodiment 2

Figure 9:
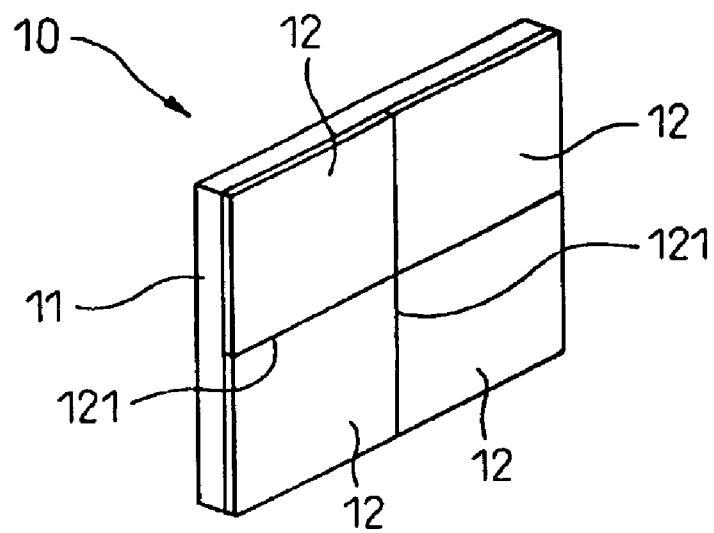
FIG. 9 is a perspective view of a hologram screen according to a second embodiment.

As shown in FIG. 9, the hologram screen 10 of this embodiment is constructed by attaching four hologram films 12 one adjacent another onto the transparent member 11.

More specifically, the hologram films 12 consist of upper two films and lower two films joined together.

Otherwise, the construction is the same as that of the first embodiment.

In FIG. 9, the upward/downward light scattering film, leftward/rightward light scattering film, and AR films are omitted for convenience of illustration.

In the hologram screen 10 thus constructed, color differences do not arise between the hologram films 121 adjacent each other across the joints 121.

The other advantageous effects are the same as those of the first embodiment.

Embodiment 3

This embodiment concerns examples of measurements of various performance factors, i.e., the chromaticity, brightness, and screen gain, made on the hologram screen 1 of the present invention as shown in FIG. 10 to FIG. 13.

First, the hologram screen of the first embodiment using both the upward/downward light scattering film and the leftward/rightward light scattering film was used as sample 1, and a hologram screen using only the upward/downward light scattering film, with the leftward/rightward light scattering film omitted, was constructed as sample 2.

Further, a prior art hologram screen using neither the upward/downward light scattering film nor the leftward/rightward light scattering film was constructed as a comparative sample.

Figure 10:
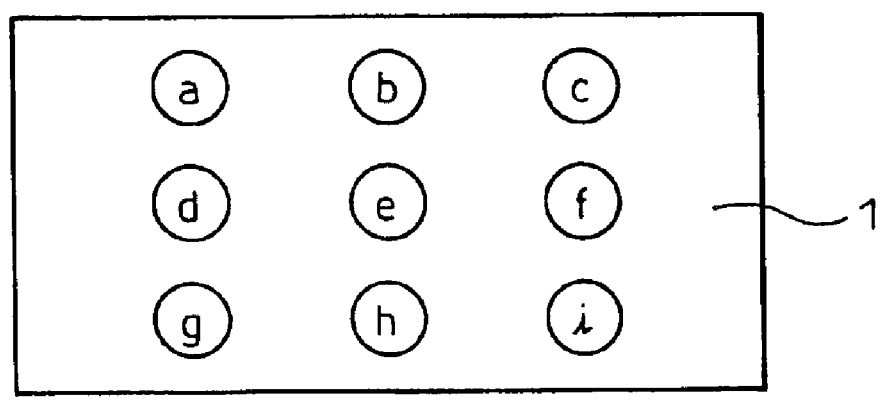
FIG. 10 is a diagram for explaining measurement positions on a hologram screen according to a third embodiment.

Then, chromaticity, brightness, and screen gain were measured on each hologram screen at measurement positions a to i shown in FIG. 10.

Figure 11A:
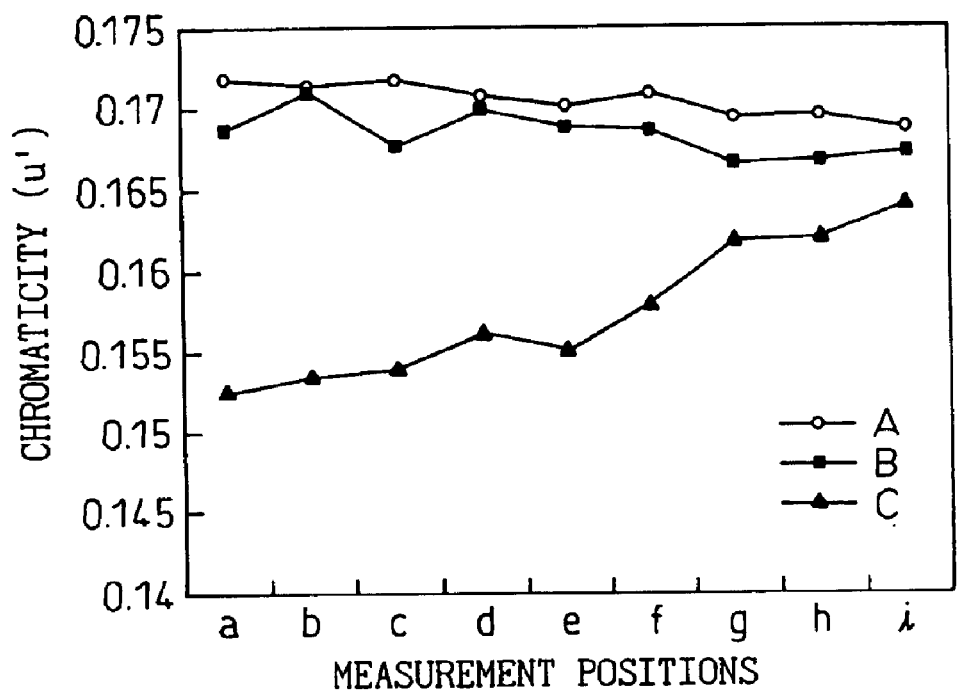
FIG. 11A and FIG. 11B are diagrams showing the results of chromaticity measurements made on the hologram screen of the third embodiment.
Figure 11B:
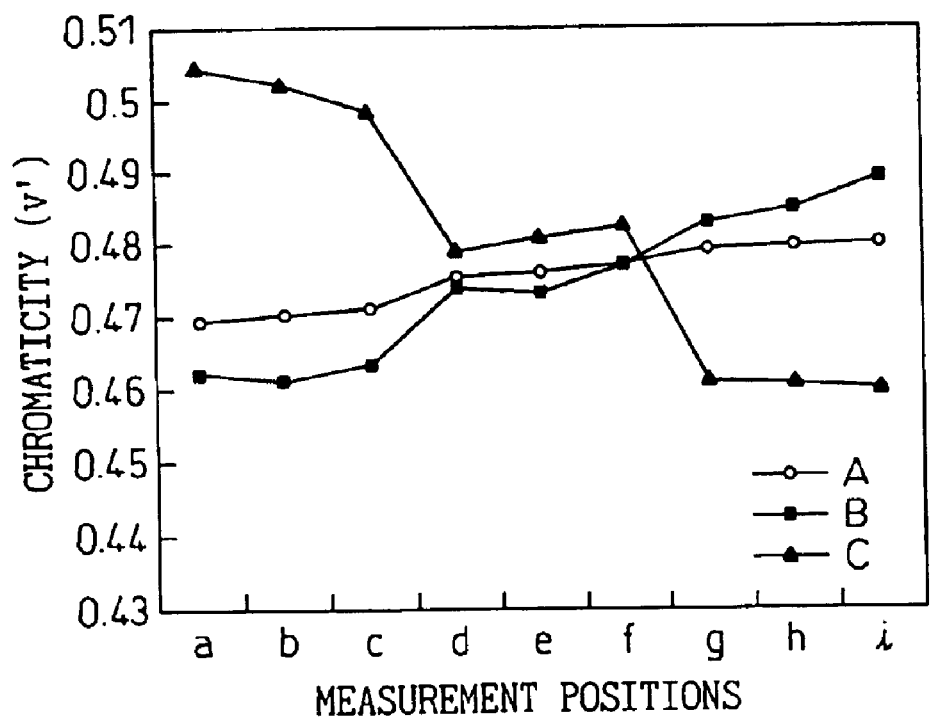
Figure 12:
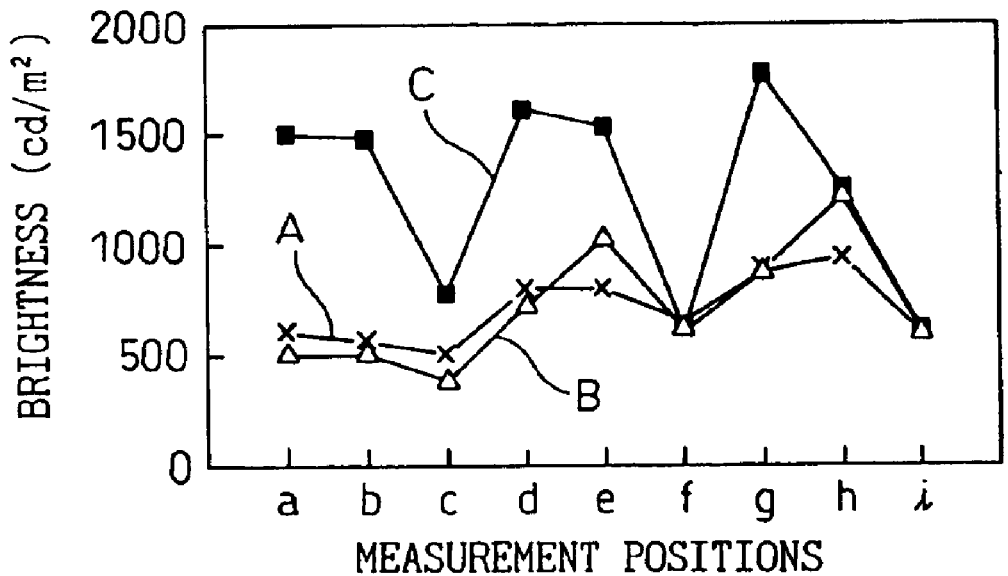
FIG. 12 is a diagram showing the results of brightness measurements made on the hologram screen of the third embodiment.
Figure 13:
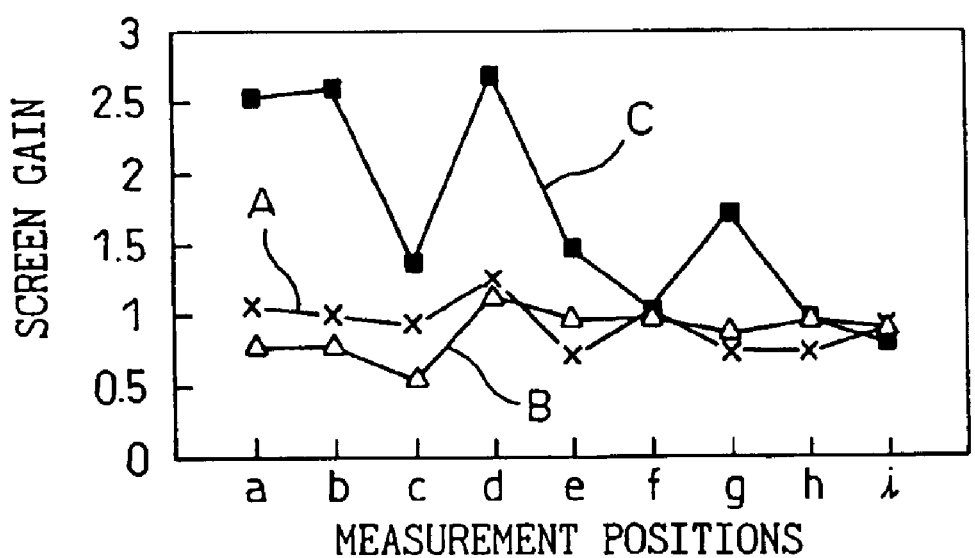
FIG. 13 is a diagram showing the results of screen gain measurements made on the hologram screen of the third embodiment.

The measured results of chromaticity are shown in FIG. 11A and FIG. 11B, and the measured results of brightness and the measured results of screen gain are shown in FIG. 12 and FIG. 13, respectively. In each figure, reference character A shows the data for the sample 1, B the data for the sample 2, and C the data for the comparative sample. The same designations also apply to FIG. 15 and FIG. 16 to be described later.

Chromaticity (u', v') defined in terms of CIE chromaticity coordinates was measured using a luminance calorimeter (for example, BM-7 (brand name) manufactured by Topcon) at the measurement positions a to i shown in FIG. 10, and the measured values of the chromaticity u' were plotted in FIG. 11A. The measured values of the chromaticity v' in terms of the CIE chromaticity coordinates were plotted in FIG. 11B.

In the above measurements, each hologram screen used was 40 inches diagonal with an aspect ratio of 3:4, and the image projection apparatus (projector) was positioned so as to provide an incidence angle of 35° to the center of the hologram screen and a projection distance of 180 cm. The upward/downward light scattering film and the leftward/rightward light scattering film used were the same in configuration as those used in the first embodiment. The luminance calorimeter BM-7 was placed on a line perpendicular to the center of the hologram screen and at a distance of 2.5 m from the hologram screen.

The screen gain is given by the following equation (5).

$$\text{(Screen gain)} = \{\text{(Brightness)} \times \Pi\}/\text{(Illuminance)} \quad (5)$$

More specifically, after measuring the illuminance of the image projection apparatus at each measurement point by using an illuminance meter placed on the image projection apparatus side of the hologram screen, brightness was measured by pointing the luminance calorimeter to the measurement point, and the screen gain was calculated using the equation (5). An IM-5 manufactured by Topcon was used as the illuminance meter here.

As can be seen from FIG. 11A and FIG. 11B, the chromaticity measured on the comparative sample varies depending on the measured position, but the variation is small in the case of the samples 1 and 2. The variation is smaller in the sample 1 than in the sample 2. That is, the sample 1 is substantially free from color unevenness.

Further, as can be seen from FIG. 12 and FIG. 13, the brightness and screen gain also vary greatly depending on the measurement position in the case of the comparative sample, but the variation is small in the case of the samples 1 and 2.

It should also be noted that for all of the chromaticity, luminance, and screen gain, the sample 1 exhibited better distributions than the sample 2.

From the above results, it can be seen that, compared with the prior art hologram screen, the hologram screen of the present invention has extremely small variations in chromaticity, luminance, and screen gain and thus achieves excellent color reproducibility.

It is also shown that using the leftward/rightward light scattering film in addition to the upward/downward light scattering film serves to further improve the distributions of variations of chromaticity, luminance, and screen gain.

Further, when the hologram screen 1 of the sample 1 (FIG. 1) was constructed by interchanging the positions of the upward/downward light scattering film 13 and the leftward/rightward light scattering film 14 as shown in FIG. 14, the hologram screen exhibited characteristics comparable to those of the sample 1. In FIG. 14, the AR films are not shown.

Figure 15A:
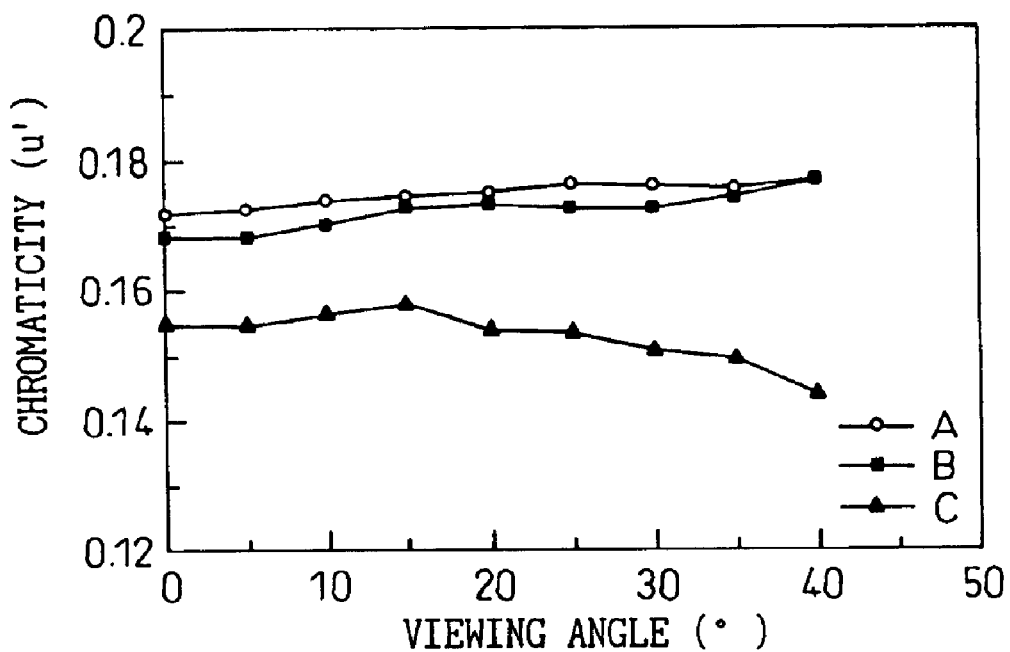
FIG. 15A and FIG. 15B are diagrams showing how the chromaticity changes with the viewing angle on the hologram screen of the third embodiment.
Figure 15B:
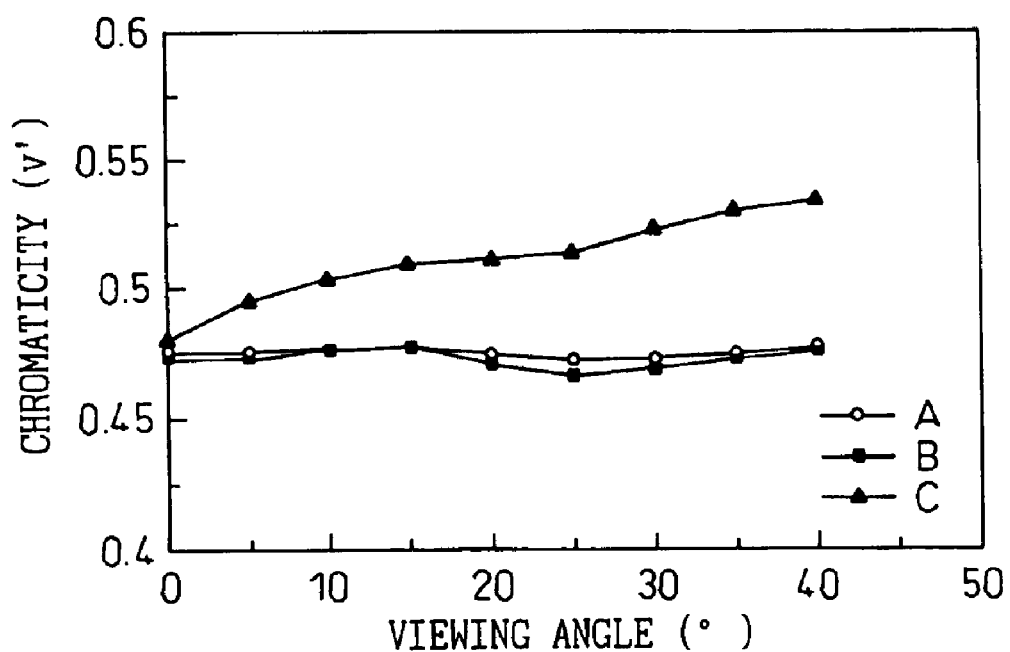

For each of the above samples, the variation of the chromaticity (u', v') was measured when the line of sight of the image observer E1 was moved. The results are shown in FIG. 15A and FIG. 15B.

From the figures, it can be seen that in the case of the samples 1 and 2, variations in hue are greatly reduced compared with the comparative sample. It was also confirmed that the sample 1 was substantially free from variations in hue, achieving extremely good color reproducibility.

Figure 16A:
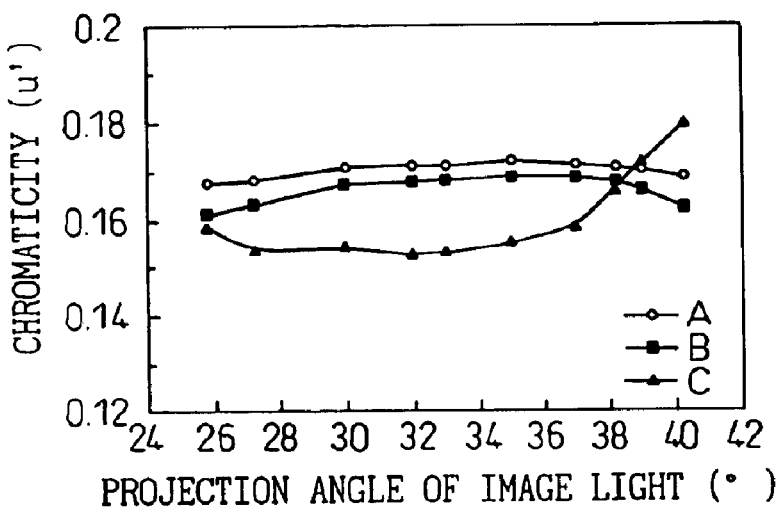
FIG. 16A to FIG. 16C are diagrams showing how the chromaticity and screen gain change with the projection angle of image light on the hologram screen of the third embodiment.
Figure 16B:
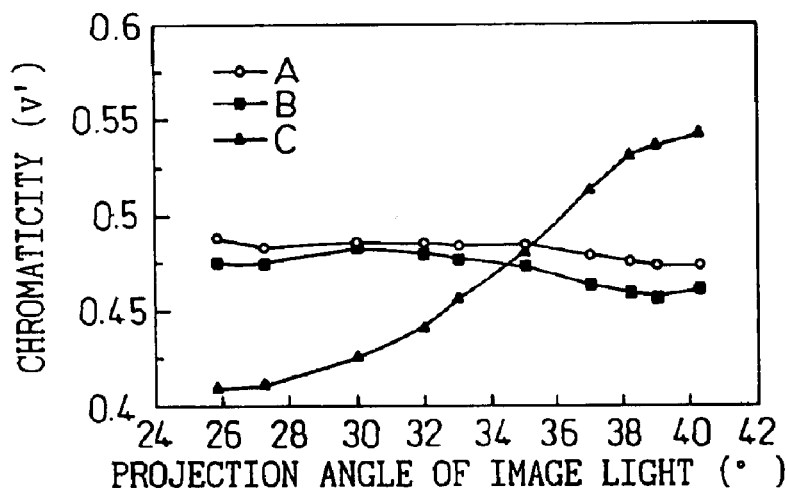
Figure 16C:
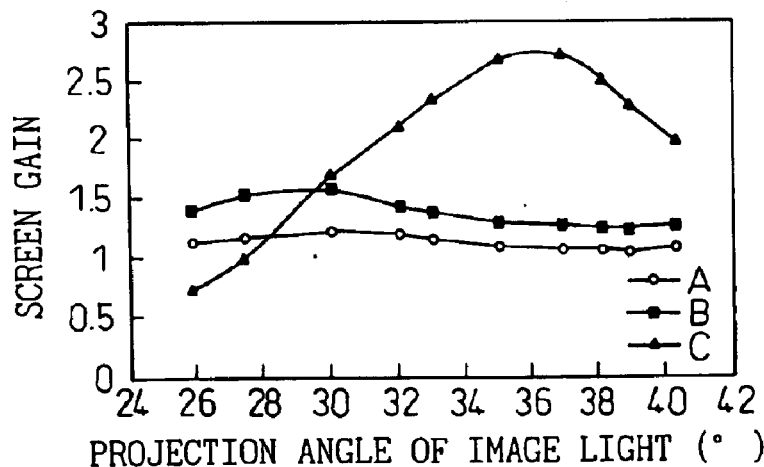

Further, variations in chromaticity (u', v') and screen gain were measured by changing the projection angle $\theta_0$ of the image light 31 (see FIG. 5A). The results are shown in FIG. 16A, FIG. 16B, and FIG. 16C.

As can be seen from the figures, it was confirmed that in the samples 1 and 2, the hue and screen gain remained substantially unchanged even when the projection angle $\theta_0$ of the image light 31 was changed.

Embodiment 4

This embodiment concerns an example in which the hologram display 4 shown in the first embodiment is installed inside an automobile 7, as shown in FIG. 7.

Figure 17A:
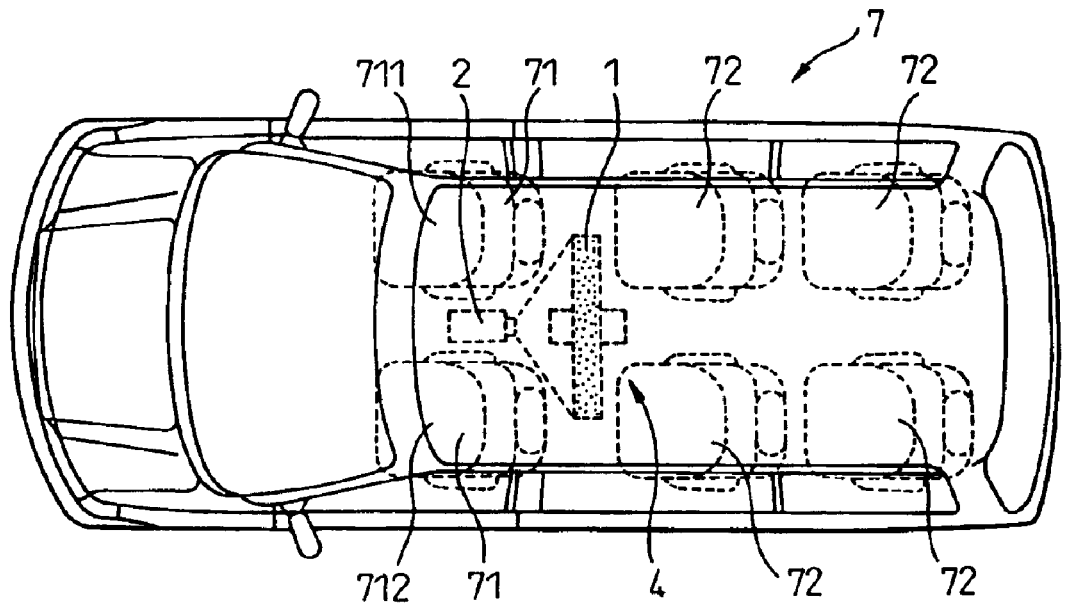
FIG. 17A is a plan view of a hologram display mounted in an automobile according to a fourth embodiment.
Figure 17B:
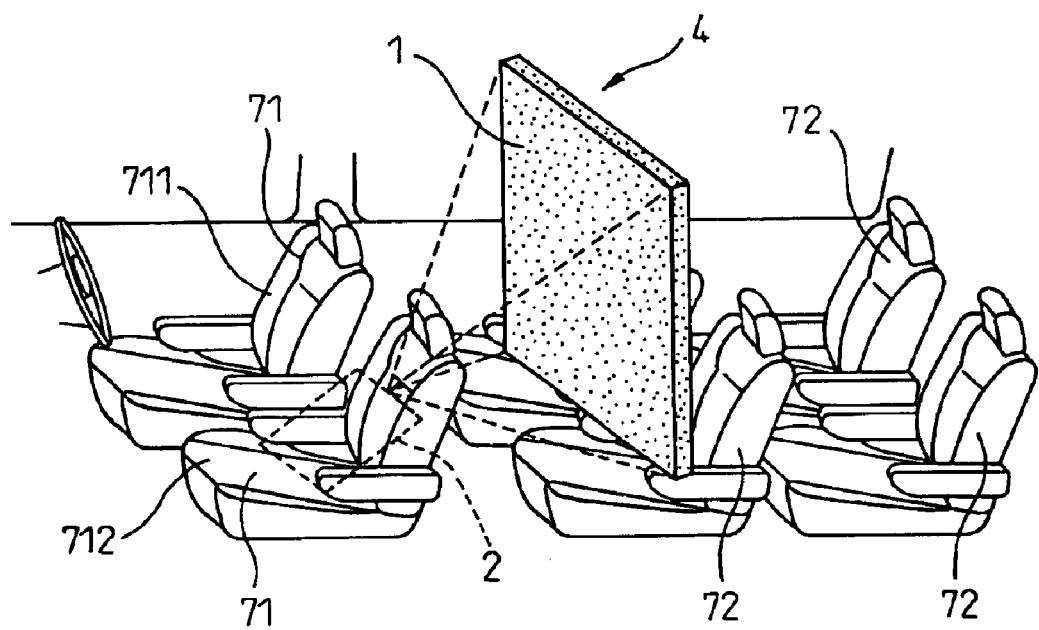
FIG. 17B is a perspective view of the hologram display mounted in the automobile according to the fourth embodiment.

More specifically, as shown in FIG. 17A and FIG. 17B, the hologram screen 1 is placed between a front seat 71 and a rear seat 72, and the image projection apparatus 2 is placed between the driver's seat 711 and the front passenger seat 712.

In this condition, passengers in the rear seats 72 view images being played back on the hologram screen 1. A view control film (LUMISTY MFZ-2555) is used as the leftward/rightward light scattering film.

Otherwise, the construction is the same as that of the first embodiment.

With this arrangement, passengers in the rear seats 72 can comfortably view images by looking at the hologram screen 1 within the leftward/rightward specific angle range.

Further, since the driver in the driver's seat 711 is situated outside the leftward/rightward specific angle range of the hologram screen 1, he or she can look backward through the hologram screen 1 without his or her view being obstructed by the hologram screen 1.

The hologram screen 1 can thus present comfortable-to-view images to the passengers in the rear seats 72, while ensuring the field of vision for the driver in the driver's seat 711.

The other advantageous effects are the same as those of the first embodiment.

Embodiment 5

Figure 18:
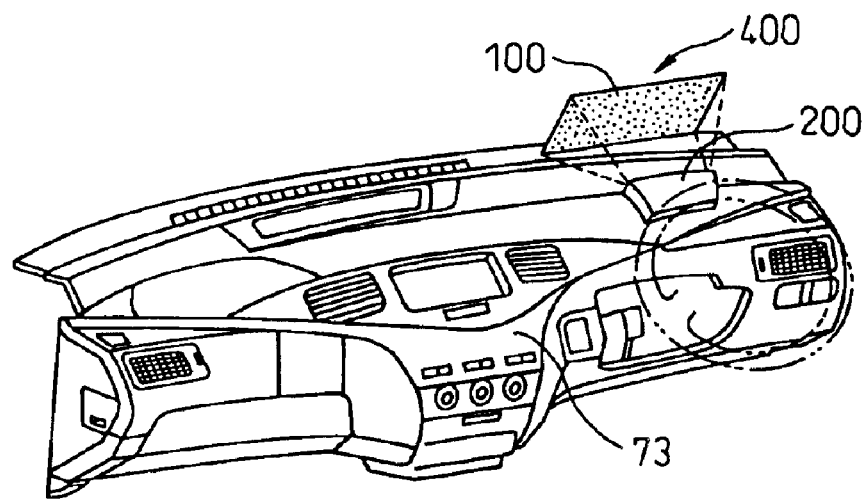
FIG. 18 is a perspective view of a hologram display mounted in an automobile according to a fifth embodiment.

This embodiment concerns a reflection-type hologram display 400 which, as shown in FIG. 18, is positioned above an instrument panel 73 of an automobile.

The hologram screen 100 of the hologram display 400 diffracts the image light projected from the image projection apparatus 200 and reflects it toward the driver's seat. The image can thus be presented for viewing by the driver.

Otherwise, the construction is the same as that of the first embodiment.

This embodiment also has the same advantageous effects as those of the first embodiment.

The present invention is not limited to automotive applications such as described above, but can also be used in various other applications; for example, the screen may be attached to a store display window for product advertising or promotion, or may be installed at a counter in a bank or a hospital to display information.

Embodiment 6

Figure 19:
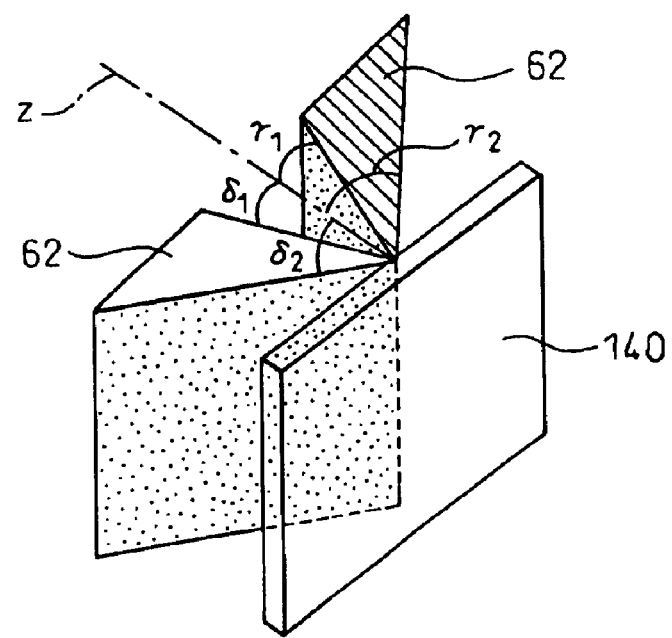
FIG. 19 is a perspective view of a leftward/rightward scattering film according to a sixth embodiment.
Figure 20:
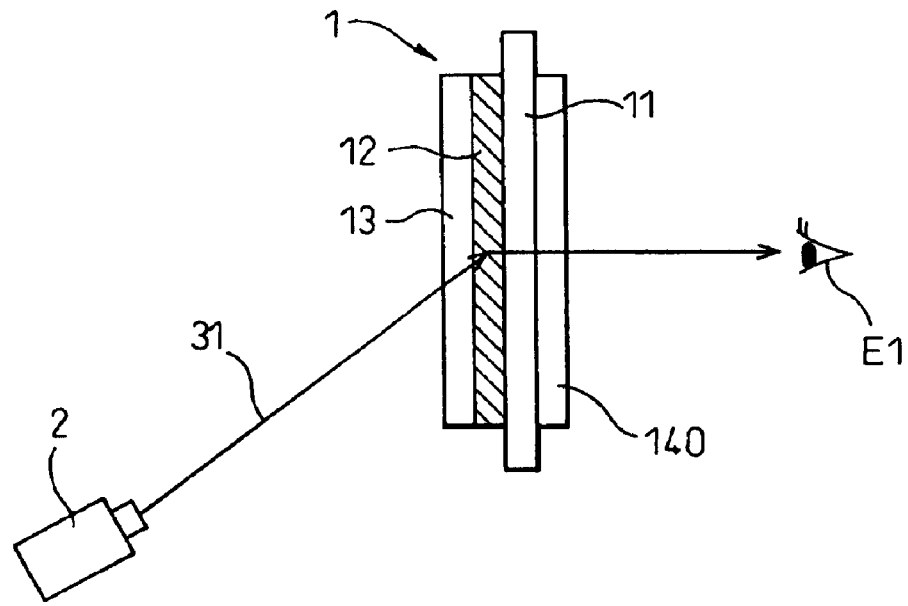
FIG. 20 is a diagram for explaining a hologram screen according to the sixth embodiment.

This embodiment concerns an example in which the leftward/rightward light scattering film 14 (FIG. 2B and FIG. 7) is replaced by a different leftward/rightward light scattering film 140 such as shown in FIG. 19.

More specifically, the leftward/rightward light scattering film 140 is constructed using a view control film (for example, LUMISTY MFZ-2555 (brand name) manufactured by Sumitomo Chemical) that provides leftward/rightward specific angle ranges, one ranging from $\gamma_1$ to $\gamma_2$ leftward and the other from $\delta_1$ to $\delta_2$ rightward relative to the normal Z to the hologram screen, i.e., the normal to the leftward/rightward light scattering film 140, where $\gamma_1$=25°, $\gamma_2$=55°, $\delta_1$=25°, and $\delta_2$=55°.

The other components, including the upward/downward light scattering film 13 and the hologram film 12, are the same as those used in the first embodiment.

Since background light incident from an angle range of ±25° to the right and left relative to the normal Z passes undiffracted through the leftward/rightward light scattering film 140, the viewer can see the background located within a certain angle range centered about a direct line of sight.

In the ranges of 25° to 55° outside the range of ±25°, the background light is scattered. As a result, when viewed from these outside ranges, the leftward/rightward light scattering film 140 appears opaque and the background cannot be seen. That is, as the background light is scattered, the brightness of the background light decreases, increasing the contrast relative to the brightness of the image light; furthermore, since objects in the background become invisible, the image visibility further increases.

In applications where color reproducibility is a major consideration, it is better to place the leftward/rightward light scattering film 140 on the image observer side 121 of the hologram film 12. In this case, color reproducibility can be further enhanced because, of the image light diffracted and scattered by the hologram film 12, the light scattered in horizontal directions is further scattered horizontally by the leftward/rightward light scattering film 140.

On the other hand, if the leftward/rightward light scattering film 140 is placed on the image projection apparatus side, the color reproducibility enhancing effect may not be fully accomplished in areas other than the edge areas of the screen.

Embodiment 7

Figure 21:
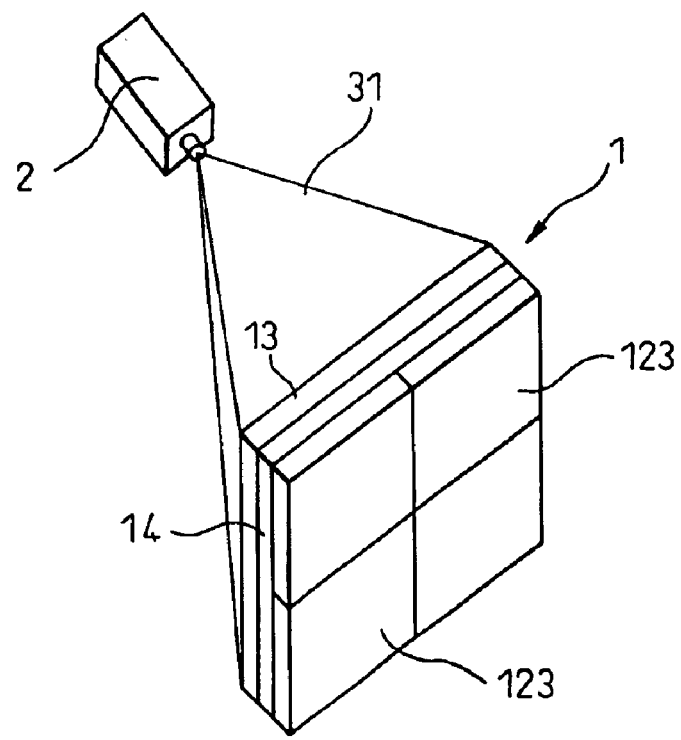
FIG. 21 is a perspective view for explaining a hologram screen according to a seventh embodiment.

This embodiment concerns an example in which the screen size is increased by joining a plurality of unit hologram films 123 together in two dimensions and laminating the upward/downward light scattering film 13 and the leftward/rightward light scattering film 14, as shown in FIG. 21.

Figure 22:
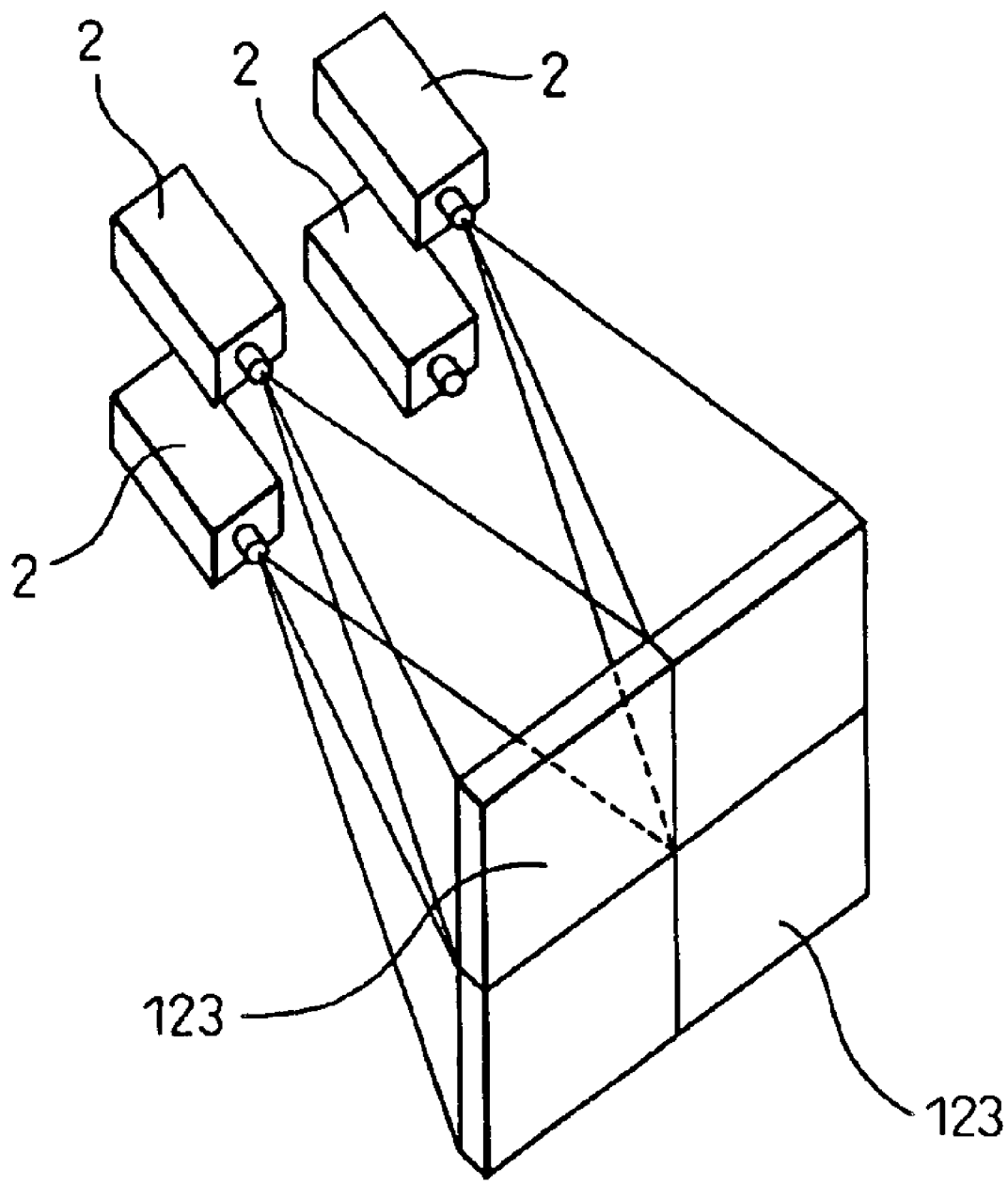
FIG. 22 is a diagram for explaining a prior art hologram screen constructed from a plurality of unit hologram films that are joined together in two dimensions to achieve an increased screen size

When a plurality of unit hologram films are joined together in two dimensions to increase the screen size, in the prior art it has been commonly practiced to project images by using a multi-projection method, that is, by using one image projection apparatus for each unit hologram film 123, as shown in FIG. 22. In other words, a plurality of image projection apparatuses 2 had to be provided.

In the present embodiment, the same effect can be achieved using only one image projection apparatus as shown in FIG. 21. In the hologram screen 1 of this embodiment, each unit hologram film 123 is 60 inches diagonal (aspect ratio=3:4), and image light 31 is projected at an incidence angle of 35° to the hologram screen 1. The upward/downward light scattering film 13 and leftward/rightward light scattering film 14 are the same as those used in the first embodiment.

Further, the projection distance of the image projection apparatus 2 is doubled to 5,400 mm compared with the projection distance of 2,700 mm in the prior art configuration (FIG. 22) that uses a plurality of image projection apparatuses 2. It is preferable that the brightness of the image projection apparatus 2 be made higher than the brightness of the image projection apparatuses 2 of the prior art (FIG. 22).

In the present embodiment, if it were not for the upward/downward light scattering film 13 and the leftward/rightward light scattering film 14, colors that could be reproduced on the respective unit hologram films 123 would not be uniform and would not match, but when the upward/downward light scattering film 13 and the leftward/rightward light scattering film 14 are provided, good color reproducibility can be achieved because the incidence angle of the image light 31 is spread out vertically and horizontally by a certain degree. This serves to provide a color quality comparable to that of the multi-projection system shown in FIG. 22.

Accordingly, a large 120-inch screen having good color reproducibility can be achieved using a single projector.

In the present embodiment, the leftward/rightward light scattering film 14 may be placed on the image observer side of the hologram films 123.

The leftward/rightward light scattering film 140 shown in the sixth embodiment (FIG. 19) may be used instead of the leftward/rightward light scattering film 14. In that case, the color reproducibility can be further enhanced by placing the leftward/rightward light scattering film 140 on the image observer side of the hologram films 123.

Figure 23:
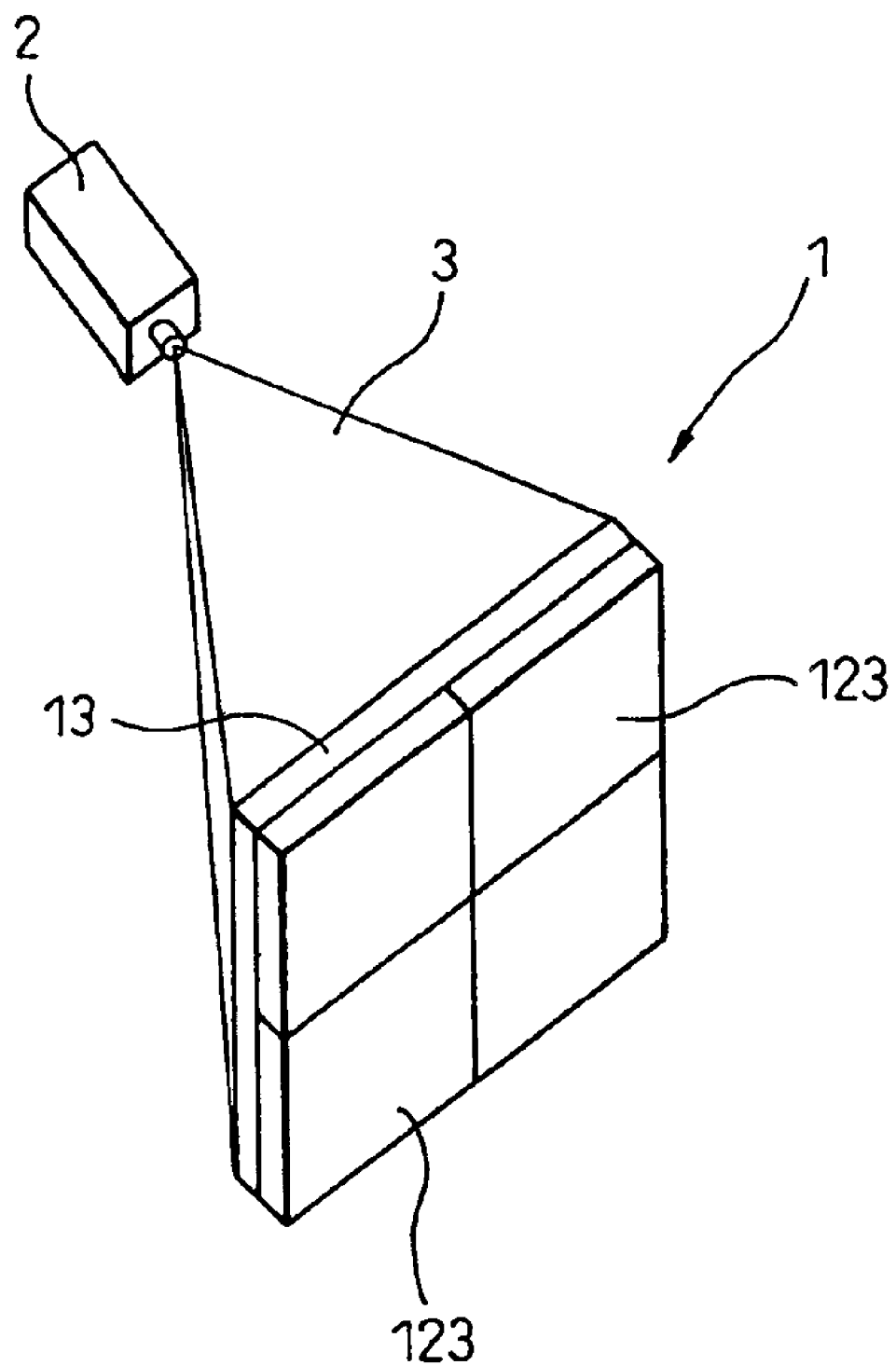
FIG. 23 is a perspective view for explaining the hologram screen of the seventh embodiment when it is constructed without providing a leftward/rightward light scattering film.

It will also be noted that some degree of color reproducibility enhancement can be achieved if the leftward/rightward light scattering film 14 is omitted as shown in FIG. 23.

Embodiment 8

Figure 24A:
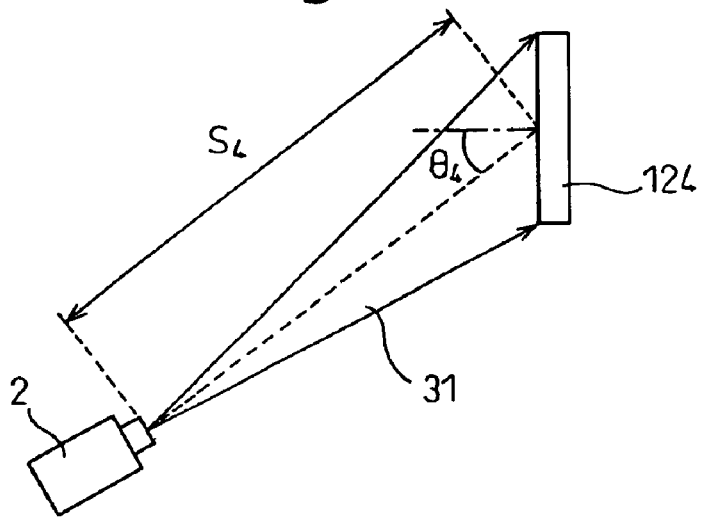
FIG. 24A to FIG. 24C are diagrams for explaining a hologram film according to an eighth embodiment.
Figure 24B:
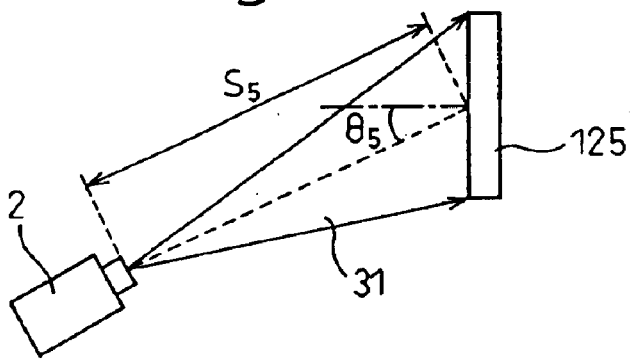
Figure 24C:
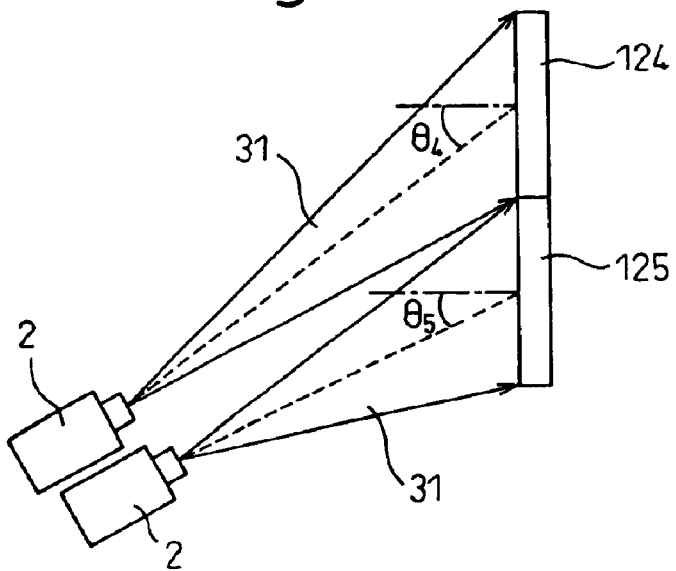
Figure 25:
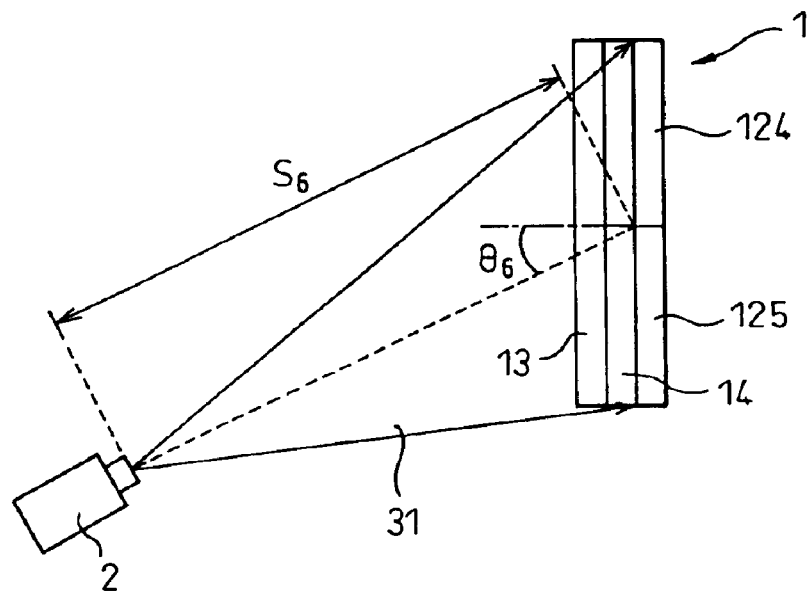
FIG. 25 is a diagram for explaining a hologram screen according to the eighth embodiment.

This embodiment concerns an example in which unit hologram films 124 and 125, with different projection angles and different projection distances, set for image light 31 at the time of manufacture, as shown in FIG. 24 and FIG. 25, are used instead of the plurality of unit hologram films 123 shown in the seventh embodiment.

That is, in the hologram screen 1 of this embodiment, the unit hologram films 124 and 125, each designed with the projection angle and projection distance of the image light 31 that would be optimum if it were used by itself, are combined together and joined one adjacent to the other in two dimensions, with the upward/downward light scattering film 13 and leftward/rightward light scattering film 14 laminated together, to achieve a larger screen size.

When the hologram film 124 is used by itself, the image light 31 is projected with a projection angle $\theta_4$ and a projection distance $S_4$, as shown in FIG. 24A.

On the other hand, when the hologram film 125 is used by itself, the image light 31 is projected with a projection angle $\theta_5$ and a projection distance $S_5$, as shown in FIG. 24B.

Therefore, if the hologram screen were constructed by simply joining the hologram films 124 and 125 one adjacent to the other, as shown in FIG. 24C, a plurality of image projection apparatuses 2 would be needed. That is, as the projection angles $\theta_4$ and $\theta_5$ and the projection distances $S_4$ and $S_5$ do not match each other, a plurality of image projection apparatuses 2 would have to be used.

In contrast, as shown in FIG. 25, the hologram screen 1 of the present embodiment is constructed by arranging two hologram films 124, each manufactured as described above, side by side in the upper half of the hologram screen 1 and also arranging two hologram films 125, each manufactured as described above, side by side in the lower half of the hologram screen 1, and by laminating the upward/downward light scattering film 13 and leftward/rightward light scattering film 14 thereto.

Then, the image light 31 is projected with a projection angle $\theta_6$ and a projection distance $S_6$, as shown in FIG. 25. A large 120-inch screen having good color reproducibility can thus be obtained.

Embodiment 9

Figure 26:
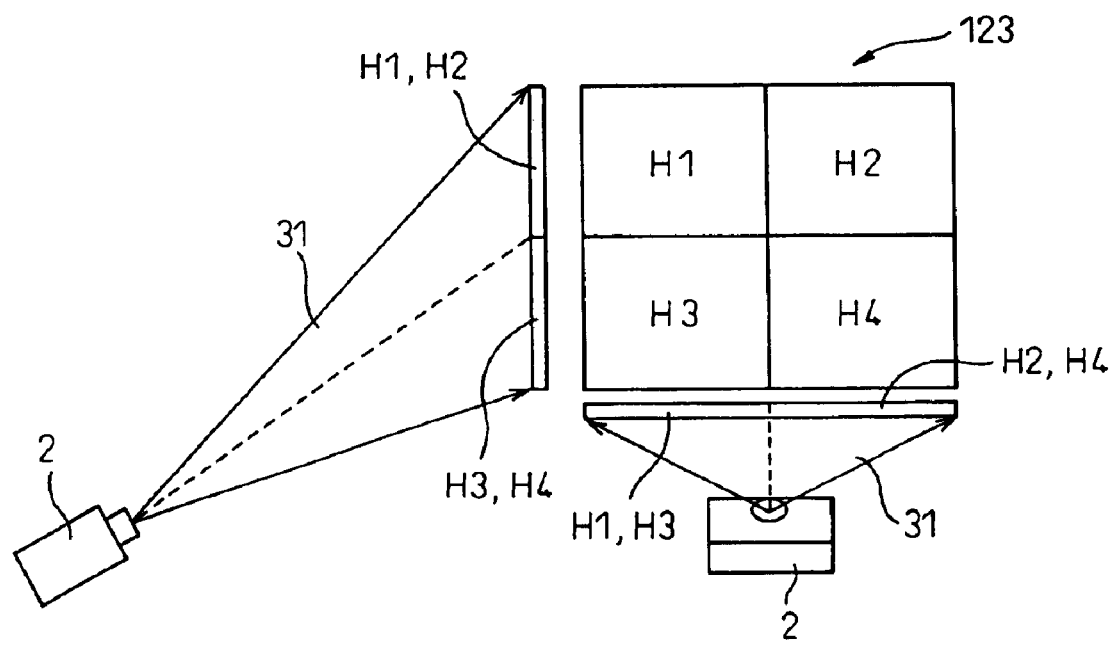
FIG. 26 is a diagram for explaining a hologram film split into four sections according to a ninth embodiment.
Figures 27A, 27B:
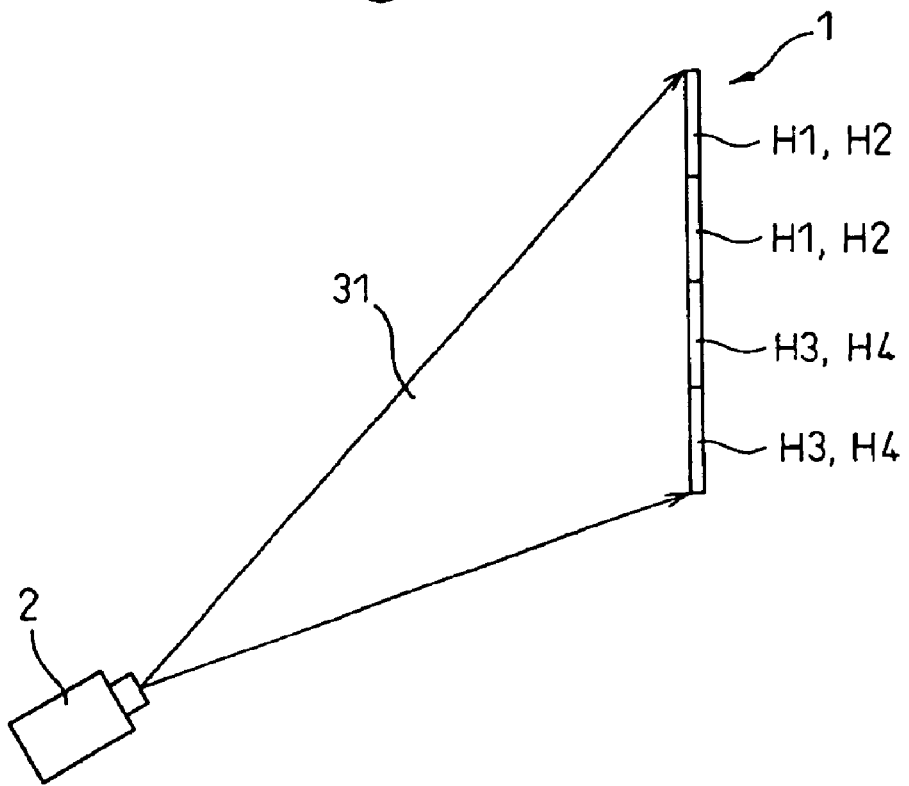
FIG. 27A is a front view for explaining the hologram screen of the ninth embodiment.
FIG. 27B is a vertical cross-sectional side view for explaining the hologram screen of the ninth embodiment.
Figure 28A:
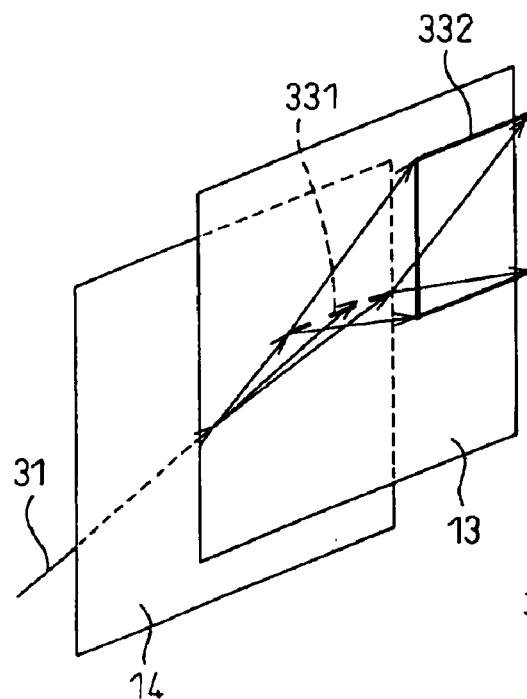
FIG. 28A to FIG. 28D are diagrams for explaining the advantageous effects of a leftward/rightward light scattering device and an upward/downward light scattering device according to the present invention.
Figure 28B:
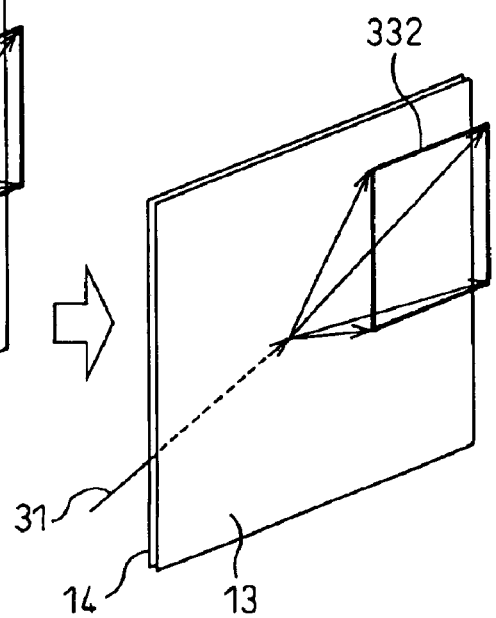
Figure 28C:
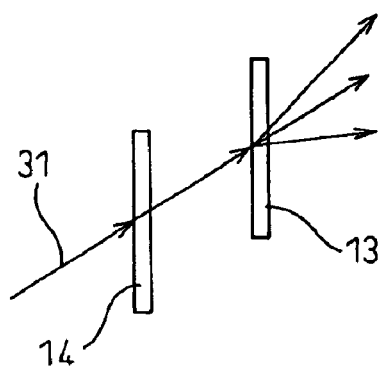
Figure 28D:
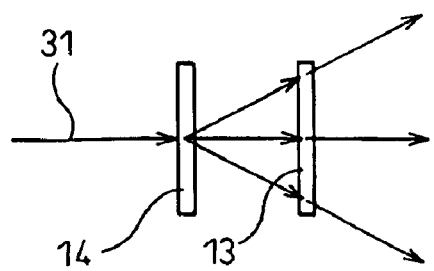
Figures 29A, 29B:
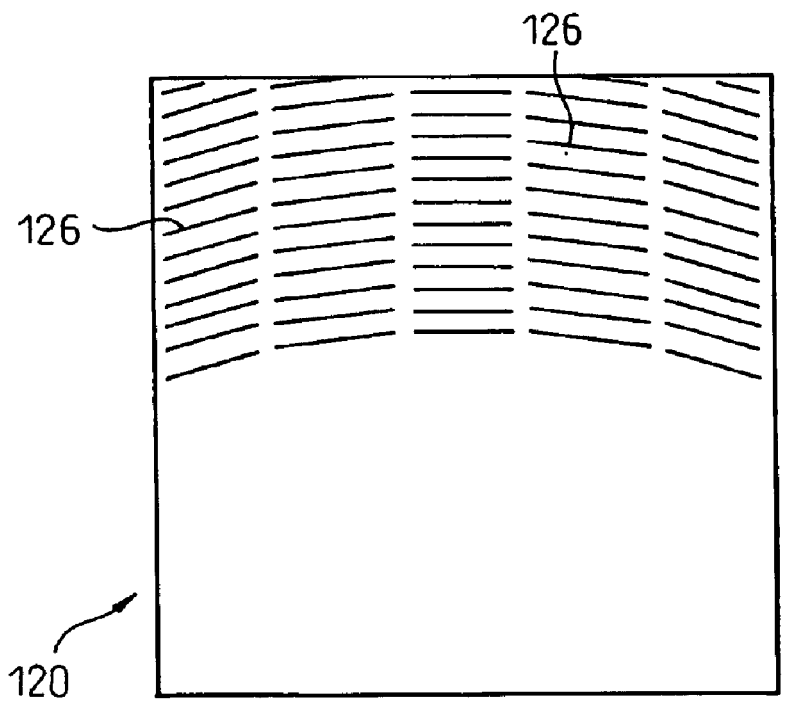
FIG. 29A and FIG. 29B are diagrams for explaining a computer hologram according to the present invention.

This embodiment concerns an example in which the unit hologram film 123 used in the eighth embodiment is split vertically and horizontally into four sections as shown in FIG. 26, four such hologram films are combined as shown in FIG. 27A to construct a large screen, and the image light 31 is projected from the image projection apparatus 2 as shown in FIG. 27B.

More specifically, the four split films H1 obtained from the upper left sections of the four hologram films 123 are arranged in the upper left section of the large-size hologram screen 1 as shown in FIG. 27A. Likewise, the four split films H2 obtained from the upper right sections, the four split films H3 obtained from the lower left sections, and the four split films H4 obtained from the lower right sections are arranged in the upper right, lower left, and lower right sections, respectively, of the large-size hologram screen 1.

The upward/downward light scattering film and the leftward/rightward light scattering film, though not shown here, are laminated in the same manner as in the seventh and eighth embodiments.

This enables the construction of an even larger size hologram screen.

Other advantageous effects are the same as those described in the seventh embodiment.

What is claimed is:

1. A hologram screen for displaying an image by diffracting and scattering image light projected from an image projection apparatus, comprising:

an upward/downward light scattering device placed on an image projection apparatus side of a hologram device in the hologram screen, and oriented so as to scatter light incident from at least one upward/downward specific angle range spreading obliquely upward or obliquely downward; and a leftward/rightward light scattering device placed between the hologram device and the upward/downward light scattering device or on the image projection apparatus side of the upward/downward light scattering device, and oriented so as to scatter light incident from a leftward/rightward specific angle range spreading obliquely leftward and obliquely rightward, wherein the upward/downward specific angle range contains an incidence angle at which the image light is incident on the hologram screen; and wherein when the leftward/rightward specific angle range is from $\gamma_1$ to $\gamma_2$ leftward and from $\delta_1$ to $\delta_2$ rightward relative to a normal to the hologram screen, $\gamma_1$, $\gamma_2$, $\delta_1$, and $\delta_2$ satisfy $$20° \leq \gamma_1 \leq 25°, \ 65° \leq \gamma_2 \leq 70°$$

$$20° \leq \delta_1 \leq 25°, \ 65° \leq \delta_2 \leq 70°.$$

2. A hologram screen as claimed in claim 1, wherein the upward/downward light scattering device and the leftward/rightward light scattering device scatter at least 20% of the light incident within the upward/downward specific angle range and the leftward/rightward specific angle range, respectively.

3. A hologram screen as claimed in claim 1, wherein the upward/downward light scattering device and the leftward/rightward light scattering device are both placed within 5 mm of the hologram device.

4. A hologram screen as claimed in claim 1, wherein the upward/downward light scattering device and the leftward/rightward light scattering, device are detachable.

5. A hologram screen as claimed in claim 1, wherein the hologram screen is constructed by joining together a plurality of hologram devices arranged in two dimensions.

6. A hologram screen as claimed in claim 5, wherein all the plurality of hologram devices have optically the same characteristics.

7. A hologram screen as claimed in claim 5, wherein the plurality of hologram devices are recorded using respectively different reference beams and therefore have optically different characteristics.

8. A hologram screen as claimed in claim 1, wherein the hologram screen is a transmission-type hologram screen.

9. A hologram screen as claimed in claim 1, wherein the hologram screen is a reflection-type hologram screen.

10. A hologram screen as claimed in claim 1, wherein the hologram device is produced by recording a diffusing plate.

11. A hologram screen as claimed in claim 1, wherein the hologram screen is a computer hologram.

12. A hologram screen for displaying an image by diffracting and scattering image light projected from an image projection apparatus, comprising:

an upward/downward light scattering device placed on an image projection apparatus side of a hologram device in the hologram screen, and oriented so as to scatter light incident from at least one upward/downward specific angle range spreading obliquely upward or obliquely downward; and a leftward/rightward light scattering device placed on an image observer side of the hologram device, and oriented so as to scatter light incident from a leftward/rightward specific angle range spreading obliquely leftward and obliquely rightward, wherein the upward/downward specific angle range contains an incidence angle at which the image light is incident on the hologram device, wherein when the leftward/rightward specific angle range is from $\gamma_1$ to $\gamma_2$ leftward and from $\delta_1$ to $\delta_2$ rightward relative to a normal to the hologram screen, $\gamma_1$, $\gamma_2$, $\delta_1$, and $\delta_2$ satisfy $$20° \leq \gamma_1 \leq 25°, \ 65° \leq \gamma_2 \leq 70°$$

$$20° \leq \delta_1 \leq 25°, \ 65° \leq \delta_2 \leq 70°.$$

13. A hologram screen as claimed in claim 12, wherein the upward/downward light scattering device and the leftward/rightward light scattering device scatter at least 20% of the light incident within the upward/downward specific angle range and the leftward/rightward specific angle range, respectively.

14. A hologram screen as claimed in claim 12, wherein the upward/downward light scattering device and the leftward/rightward light scattering device are both placed within 5 mm of the hologram device.

15. A hologram screen as claimed in claim 12, wherein the upward/downward light scattering device and the leftward/rightward light scattering device are detachable.

16. A hologram screen as claimed in claim 12, wherein the hologram screen is constructed by joining together a plurality of hologram devices arranged in two dimensions.

17. A hologram screen as claimed in claim 16, wherein all the plurality of hologram devices have optically the same characteristics.

18. A hologram screen as claimed in claim 16, wherein the plurality of hologram devices are recorded using respectively different reference beams and therefore have optically different characteristics.

19. A hologram screen as claimed in claim 12, wherein the hologram screen is a transmission-type hologram screen.

20. A hologram screen as claimed in claim 12, wherein the hologram screen is a reflection-type hologram screen.

21. A hologram screen as claimed in claim 12, wherein the hologram device is produced by recording a diffusing plate.

22. A hologram screen as claimed in claim 12, wherein the hologram screen is a computer hologram.

23. A hologram display comprising:

a hologram screen for displaying an image by diffracting and scattering image light; and a projection apparatus for projecting the image light onto the hologram screen, wherein the hologram screen comprises:

an upward/downward light scattering device placed on an image projection apparatus side of a hologram device in the hologram screen, and oriented so as to scatter light incident from at least one upward/downward specific angle range spreading obliquely upward or obliquely downward; and a leftward/rightward light scattering device placed on an image observer side of the hologram device, and oriented so as to scatter light incident from a leftward/rightward specific angle range spreading obliquely leftward and obliquely rightward, wherein:

the upward/downward specific angle range contains an incidence angle at which the image light is incident on the hologram device, and when the leftward/rightward specific angle range is from $\gamma_1$ to $\gamma_2$ leftward and from $\delta_1$ to $\delta_2$ rightward relative to a normal to the hologram screen, $\gamma_1$, $\gamma_2$, $\delta_1$, and $\delta_2$ satisfy $$20° \leq \gamma_1 \leq 25°, \ 65° \leq \gamma_2 \leq 70°$$

$$20° \leq \delta_1 \leq 25°, \ 65° \leq \delta_2 \leq 70°.$$

* * * * *